United States Patent
Nakayama

(10) Patent No.: US 10,764,106 B2
(45) Date of Patent: Sep. 1, 2020

(54) INFORMATION PROCESSING DEVICE, METHOD, AND PROGRAM FOR IQ BALANCE CORRECTION

(71) Applicant: SONY MOBILE COMMUNICATIONS INC., Tokyo (JP)

(72) Inventor: Takashi Nakayama, Chiba (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/314,662

(22) PCT Filed: May 23, 2017

(86) PCT No.: PCT/JP2017/019188
§ 371 (c)(1),
(2) Date: Jan. 1, 2019

(87) PCT Pub. No.: WO2018/012117
PCT Pub. Date: Jan. 18, 2018

(65) Prior Publication Data
US 2019/0173730 A1    Jun. 6, 2019

(30) Foreign Application Priority Data

Jul. 14, 2016   (JP) .................................. 2016-139586

(51) Int. Cl.
*H04L 27/36* (2006.01)
*H04L 27/26* (2006.01)
(Continued)

(52) U.S. Cl.
CPC ............ *H04L 27/364* (2013.01); *H04L 5/005* (2013.01); *H04L 5/0048* (2013.01);
(Continued)

(58) Field of Classification Search
CPC ......... H04L 27/36; H04L 27/26; H04L 27/34; H04L 27/38; H04L 5/00; H04L 27/364;
(Continued)

(56) References Cited

U.S. PATENT DOCUMENTS

| 2012/0063549 A1* | 3/2012 | Futami .................. H04L 25/067 375/320 |
| 2014/0155006 A1* | 6/2014 | Matsuura ............... H04B 17/11 455/114.3 |
| 2016/0080961 A1 | 3/2016 | Kim et al. |

FOREIGN PATENT DOCUMENTS

| CN | 105723672 A | 6/2016 |
| EP | 3051765 A1 | 9/2014 |

(Continued)

OTHER PUBLICATIONS

European Search Report dated Jul. 5, 2019, issued in corresponding EP Application No. 17827250.6, 8 pages.
(Continued)

*Primary Examiner* — Kyaw Z Soe
(74) *Attorney, Agent, or Firm* — Xsensus LLP

(57) ABSTRACT

[Object] To realize IQ imbalance correction in a more preferable aspect.
[Solution] An information processing device including: a calculation unit configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and a generation unit configured to generate correction data for correcting a deviation of a signal point of a received signal on a basis of a calculation result of the error.

10 Claims, 31 Drawing Sheets

(51) Int. Cl.
*H04L 27/38* (2006.01)
*H04L 27/20* (2006.01)
*H04L 5/00* (2006.01)
*H04L 27/34* (2006.01)
*H04L 27/00* (2006.01)

(52) U.S. Cl.
CPC ........ *H04L 27/2082* (2013.01); *H04L 27/264* (2013.01); *H04L 27/2607* (2013.01); *H04L 27/2697* (2013.01); *H04L 27/3405* (2013.01); *H04L 27/38* (2013.01); *H04L 27/3863* (2013.01); *H04L 5/0007* (2013.01); *H04L 2027/0016* (2013.01)

(58) Field of Classification Search
CPC ... H04L 5/0048; H04L 27/2607; H04L 5/005; H04L 27/2082; H04L 27/264; H04L 27/2697; H04L 27/3863; H04L 27/3405
See application file for complete search history.

(56) References Cited

FOREIGN PATENT DOCUMENTS

| | | | |
|---|---|---|---|
| EP | 3214815 A1 | 10/2015 | |
| JP | 08205233 A | 8/1996 | |
| JP | 2003-060609 A | 2/2003 | |
| JP | 2004-356936 A | 12/2004 | |
| JP | 2007-074618 A | 3/2007 | |
| JP | 2008-098973 A | 4/2008 | |
| JP | 2008-535334 A | 8/2008 | |
| JP | 2014-502816 A | 2/2014 | |
| WO | 2010/014805 A1 | 2/2010 | |
| WO | WO-2014199864 A1 * | 12/2014 | ............ H04L 27/38 |
| WO | 2015/031075 A1 | 3/2015 | |
| WO | 2015/128420 A1 | 9/2015 | |
| WO | 2016067938 A1 | 5/2016 | |

OTHER PUBLICATIONS

International Search Report dated Aug. 8, 2017 for PCT/JP2017/019188 filed on May 23, 2017, 9 pages including english translation.

* cited by examiner

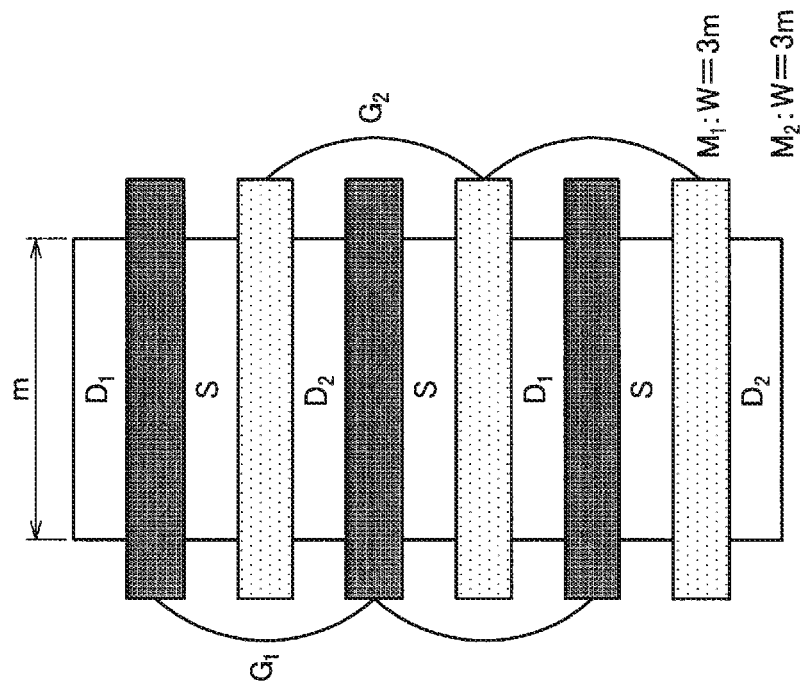
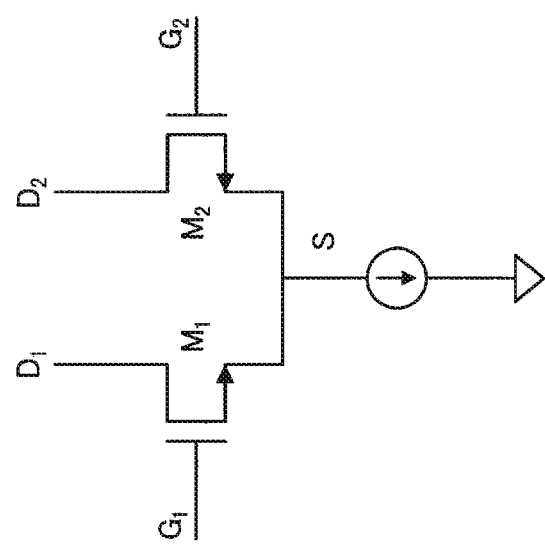
FIG. 19

INFORMATION PROCESSING DEVICE, METHOD, AND PROGRAM FOR IQ BALANCE CORRECTION

CROSS-REFERENCE TO RELATED APPLICATIONS

This application is a National Stage Application based on PCT/JP2017/019188, filed on 23 May 2017, and claims priority to Japanese Patent Application No. 2016-139586, filed on 14 Jul. 2016, the entire contents of which being incorporated herein by reference.

TECHNICAL FIELD

The present disclosure relates to an information processing device, a communication device, an information processing method, a communication method, and a program.

BACKGROUND ART

In a communication standard such as Long Term Evolution (LTE)/LTE-Advanced (LTE-A), an orthogonal frequency-division multiple access (OFDMA) method is adopted as a communication method for realizing so-called multiple access. In orthogonal frequency-division multiplexing (OFDM) represented by OFDMA, for example, information is further multiplexed by encoding a transmission signal by a modulation method such as phase modulation (phase-shift keying (PSK)) or quadrature amplitude modulation (QAM).

In addition, in recent years, new communication methods called filter bank multicarrier (FBMC), filtered OFDM (f-OFDM), and the like, for example, have been considered as a radio access technology (RAT) of a fifth generation (5G) mobile communication system following LTE/LTE-A. In addition, introduction of a modulation method called Offset QAM (OQAM) is also being considered.

CITATION LIST

Patent Literature

Patent Literature 1: WO 2010/0114805

DISCLOSURE OF INVENTION

Technical Problem

On the other hand, in the communication method adopting PSK or QAM, IQ imbalance occurs due to imperfection of a circuit (for example, various mixers and the like) for realizing modulation or demodulation of transmitted and received signals in some cases. The imperfection of such a circuit is manifested, for example, due to a variation in devices (transistors or the like) included in the circuit. Particularly, in the communication methods considered for 5G, it is desired to realize a peak data rate of 10 Gbps or more, and it is speculated that degradation of communication quality due to the IQ imbalance will appear more noticeably than with the existing communication method.

In response to such a problem, for example, Patent Literature 1 discloses an example of a mechanism for correcting (calibrating) the IQ imbalance. However, in the configuration disclosed in Patent Literature 1, since a circuit configuration is complicated, a circuit scale increases.

Therefore, the present disclosure proposes an information processing device, a communication device, an information processing method, a communication method, and a program capable of realizing IQ imbalance correction in a more preferable aspect.

Solution to Problem

According to the present disclosure, there is provided an information processing device including: a calculation unit configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and a generation unit configured to generate correction data for correcting a deviation of a signal point of a received signal on a basis of a calculation result of the error.

In addition, according to the present disclosure, there is provided a communication device including: a calculation unit configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; a generation unit configured to generate correction data for correcting a deviation of a signal point of a received signal on a basis of a calculation result of the error; a communication unit configured to perform wireless communication; and a correcting unit configured to correct the deviation of the signal point of the received signal received through the wireless communication on a basis of the generated correction data.

In addition, according to the present disclosure, there is provided an information processing method including: calculating, by a processor, an error between predetermined reference coordinates on an IQ plane and a signal point of a received predetermined reference signal on a basis of a reception result of the reference signal on which phase modulation or quadrature amplitude modulation is implemented and mapping information of the reference signal; and generating, by the processor, correction data for correcting a deviation of a signal point of a received signal on a basis of a calculation result of the error.

In addition, according to the present disclosure, there is provided a communication method including: calculating, by a processor, an error between predetermined reference coordinates on an IQ plane and a signal point of a received predetermined reference signal on a basis of a reception result of the reference signal on which phase modulation or quadrature amplitude modulation is implemented and mapping information of the reference signal; generating, by the processor, correction data for correcting a deviation of a signal point of a received signal on a basis of a calculation result of the error; performing, by a communication unit, wireless communication; and correcting, by the processor, the deviation of the signal point of the received signal received through the wireless communication on a basis of the generated correction data.

In addition, according to the present disclosure, there is provided a program that causes a computer to execute: calculating an error between predetermined reference coordinates on an IQ plane and a signal point of a received predetermined reference signal on a basis of a reception result of the reference signal on which phase modulation or quadrature amplitude modulation is implemented and mapping information of the reference signal; and generating correction data for correcting a deviation of a signal point of a received signal on a basis of a calculation result of the error.

In addition, according to the present disclosure, there is provided a program that causes a computer to execute, calculating an error between predetermined reference coordinates on an IQ plane and a signal point of a received predetermined reference signal on a basis of a reception result of the reference signal on which phase modulation or quadrature amplitude modulation is implemented and mapping information of the reference signal; and generating correction data for correcting a deviation of a signal point of a received signal on a basis of a calculation result of the error; performing wireless communication; and correcting the deviation of the signal point of the received signal received through the wireless communication on a basis of the generated correction data.

Advantageous Effects of Invention

As described above, according to the present disclosure, there are provided an information processing device, a communication device, an information processing method, a communication method, and a program capable of realizing correction of IQ imbalance in a more preferable aspect.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is an explanatory diagram for explaining an example of an IC layout for reducing mismatch in a pair of MOS transistors.

MODE(S) FOR CARRYING OUT THE INVENTION

Figure 1:
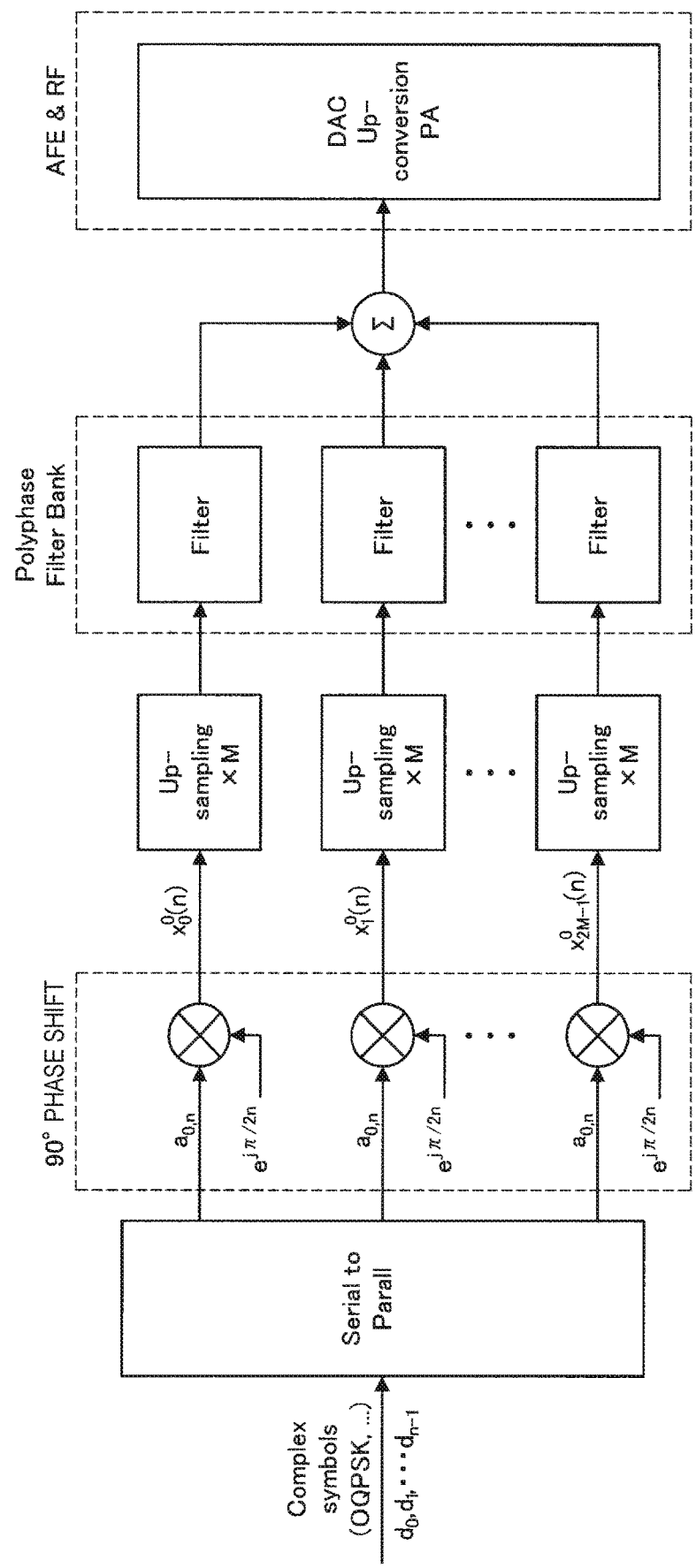
FIG. 1 is a block diagram illustrating an example of a schematic functional configuration of a modulator based on an FBMC/OQAM method.

Hereinafter, (a) preferred embodiments) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following sequence.
1. FBMC/OQAM
2. f-OFDM
3. Consideration of IQ imbalance
3.1. Double balanced mixer
3.2. Variation in features between devices
3.3. Technical problem
4. Configuration example
4.1. Configuration example of system
4.2. Configuration example of base station
4.3. Configuration example of terminal device
5. Technical feature
5.1. Reference signal
5.2. Generation of correction data
6. Embodiment
6.1. Embodiment 1: example of design of DCR chip
6.2. Embodiment 2: correction of IQ imbalance
7. Application example
8. Hardware configuration
9. Conclusion

1. FBMC/OQAM

First, an FBMC/OQAM method that is being considered as one of radio access technologies (RATs) of a fifth generation (5G) mobile communication system following LTE/LTE-A will be described with reference to FIGS. 1 to 7.
(Functional Configuration of Modulator)

For example, FIG. 1 is a block diagram illustrating an example of a schematic functional configuration of a modulator based on the FBMC/OQAM method. Note that, in the example shown in FIG. 1, attention is paid to a transmission process in which a signal on which OQAM modulation is implemented is input. Note that the OQAM modulation will be separately described later.

As shown in FIG. 1, bit streams $d_0, d_1, \ldots, d_{n-1}$ of serial signals to be transmitted, on which the OQAM modulation is implemented, are converted into parallel signals $a_{0,n}$, $a_{1,n}, \ldots, a_{2M-1a,n}$. In addition, each of the parallel signals $a_{0,n}, a_{1,n}, \ldots, a_{2M-1a,n}$, n is alternately shifted by 90° in phase by a mixer positioned in a subsequent stage, and an up-scaling process of M times is implemented on the parallel signals $a_{0,n}, a_{1,n}, \ldots, a_{2M-1a,n}$. Therefore, the parallel signals $a_{0,n}, a_{1,n}, \ldots, a_{2M-1a,n}$ are converted into M spectra in a frequency domain.

Figure 2:
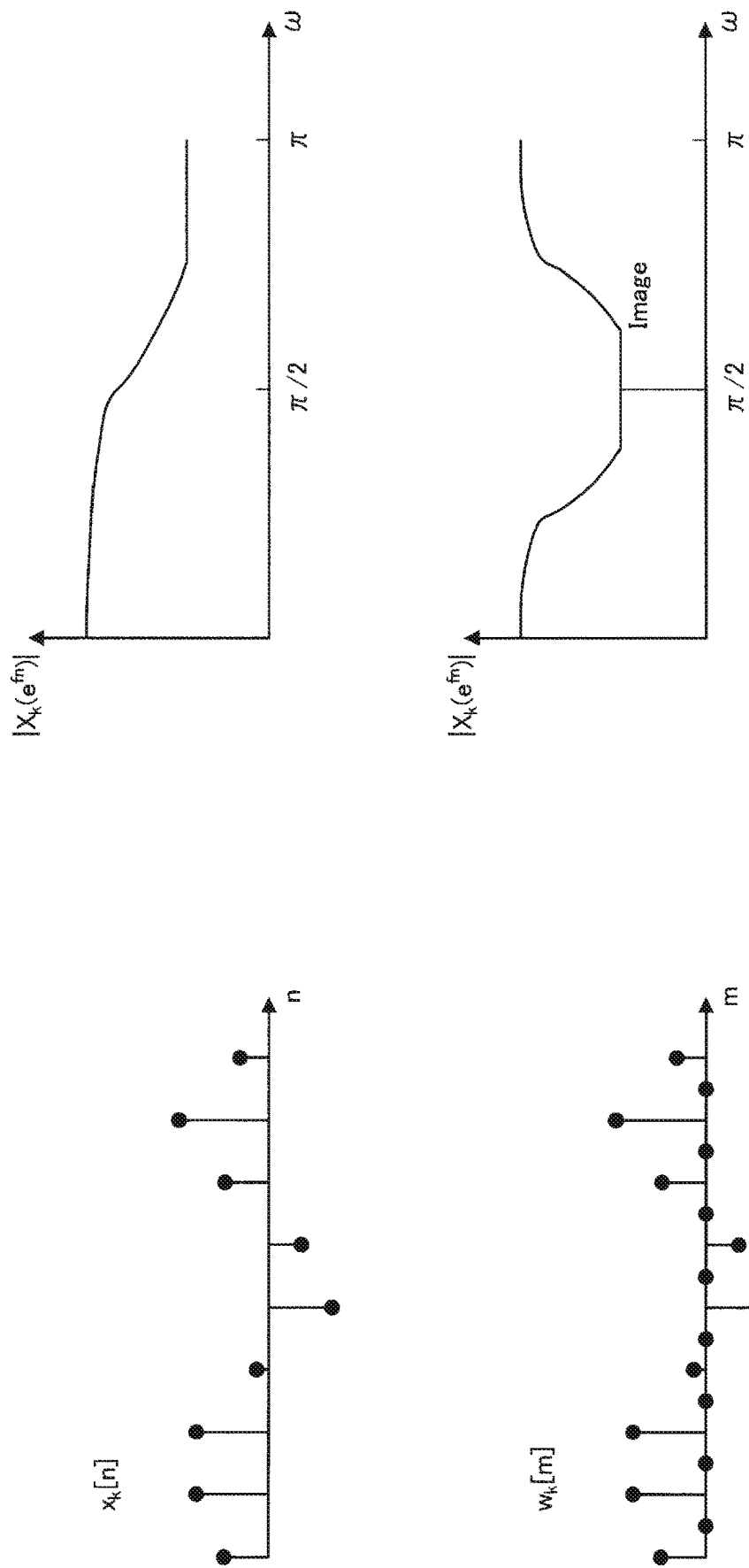
FIG. 2 is an explanatory diagram for explaining an example of an up-sampling process.

For example, FIG. 2 is an explanatory diagram for explaining an example of an up-sampling process, and illustrates an example of a case in which up-sampling is performed so that the number of samples is doubled by zero interpolation. In FIG. 2, the two upper diagrams show examples of signals before the up-sampling. Specifically, the upper left diagram shows a signal $x_{k[n]}$ in a time domain. In addition, the upper right diagram shows a spectrum $|X_k(e^{f n})|$ in a frequency domain of the signal shown in the upper left diagram. In addition, the two lower diagrams show an example of signals on which the up-sampling is performed so that the number of samples is doubled by the zero interpolation. Specifically, the lower left diagram shows a signal $w_k[n]$ in the time domain. In addition, the lower right diagram shows a spectrum $|w_k(e^{f n})|$ in the frequency domain of the signal shown in the lower left diagram. Note that, in the two left diagrams, a horizontal axis denotes time and a vertical axis denotes an amplitude of the signal. In addition, in the two right diagrams, a horizontal axis denotes a frequency and a vertical axis denotes an amplitude of the signal.

Specifically, in the example shown in FIG. 2, the signal is up-sampled to be doubled by inserting a new sample of which an amplitude is zero (that is, interpolating by zero) between the samples of the signal shown in the upper left diagram, as shown in the lower left diagram. Here, as can be understood by comparing the two right diagrams of FIG. 2, a bandwidth of the spectrum $|X_k(e^{f n})|$ becomes ½ according to the double up-sampling, and in addition, a high frequency signal called imaging is generated.

Figure 3:
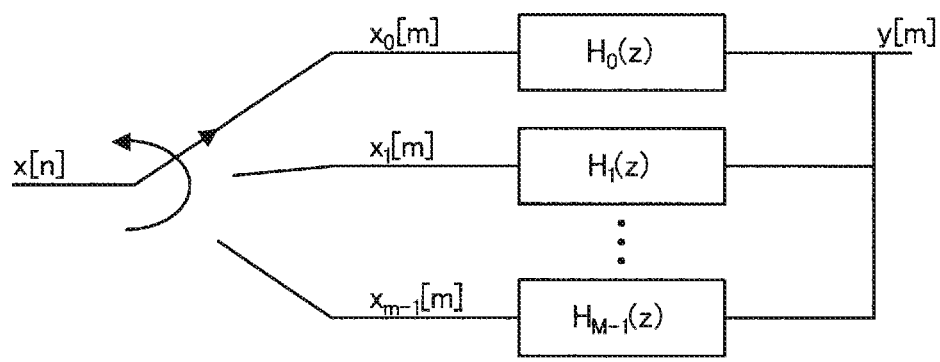
FIG. 3 is an explanatory diagram for explaining a polyphase filter bank.
Figure 4:
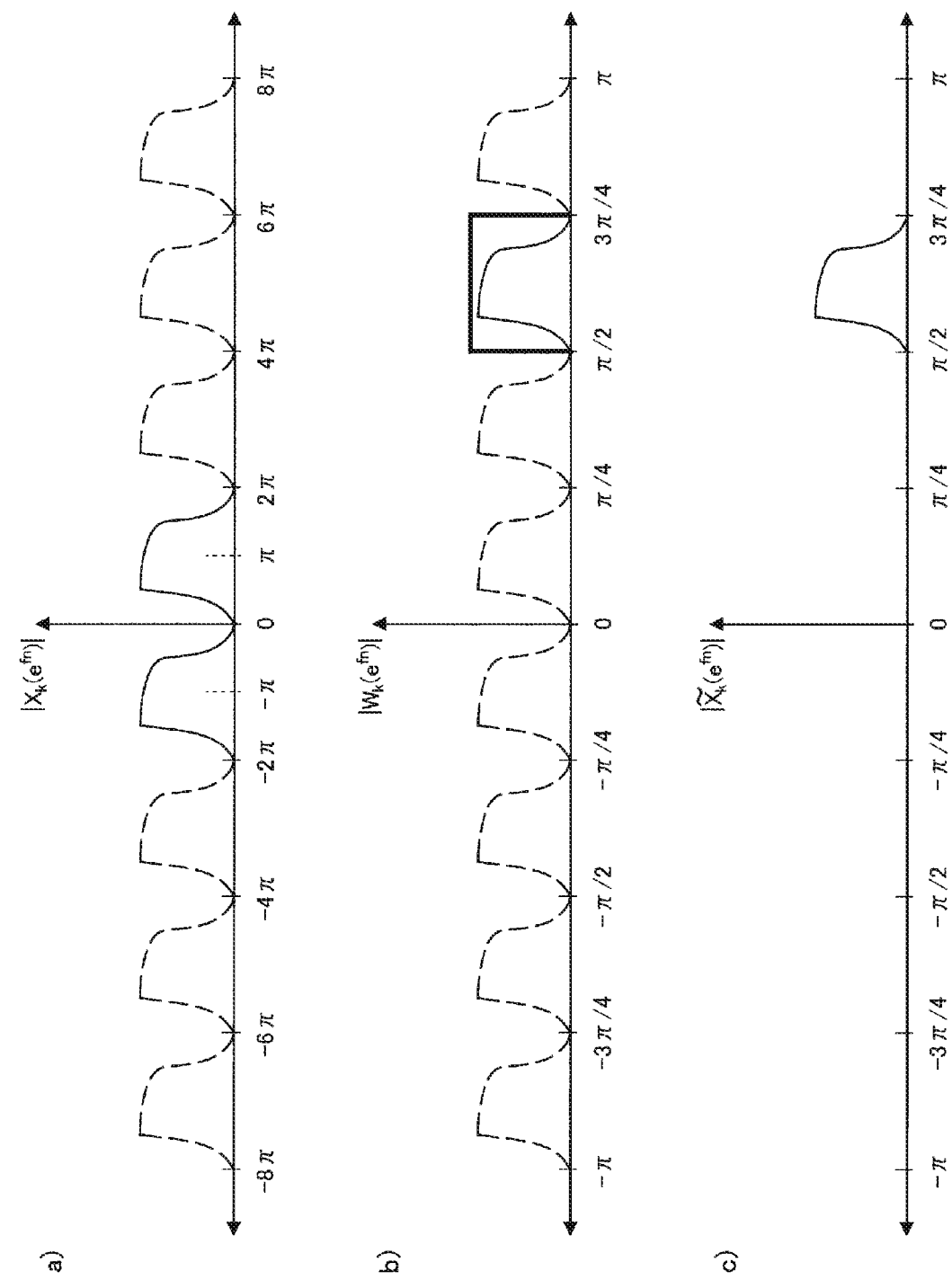
FIG. 4 is an explanatory diagram for explaining a polyphase filter bank.

Next, as shown in FIG. 1, a filtering process by a polyphase filter bank is implemented on a signal on which up-sampling of M times is implemented. For example, FIGS. 3 and 4 are explanatory diagrams for explaining the polyphase filter bank. Specifically, FIG. 3 illustrates an example of a configuration of the polyphase filter bank. In addition, FIG. 4 illustrates an example of a filter process by the polyphase filter bank.

As shown in FIG. 3, the polyphase filter bank sequentially switches a filter that is an input destination of an input signal x[n] among filters $H_0(z)$ to $H_{M-1}(z)$ that extract components of frequency bands different from each other. The polyphase filter bank selectively extracts the components of each frequency band included in the input signal x[n] and outputs the components by such control.

For example, in FIG. 4, the upper diagram shows the spectrum $|X_k(e^{f n})|$ in the frequency domain of the signal before the up-sampling. In addition, the middle diagram shows the spectrum $|W_k(e^{f n})|$ in the frequency domain of the signal after the up-sampling. Note that the middle diagram shows an example of a case in which components in the frequency band of π/2 to 3π/4 are extracted as the filtering process by the polyphase filter bank and schematically shows a corresponding filter. In addition, the lower diagram shows the spectrum $|X''_k(e^{f n})|$ in the frequency domain of the signal after the filtering process by the polyphase filter bank. Note that "X"" indicates a character with a tilde above "X."

In addition, as shown in FIG. 1, the parallel signals on which the filtering process is implemented by the polyphase filter bank are added to each other, processes of DA conversion, up-conversion, gain adjustment, and the like are implemented on the parallel signals in an analog front end (AFE), and thus the parallel signals are converted into a radio frequency (RF) signal.

The example of the schematic functional configuration of the modulator based on the FBMC/OQAM method has been described above with reference to FIGS. 1 to 4.
(OQAM Modulation)

Figure 5:
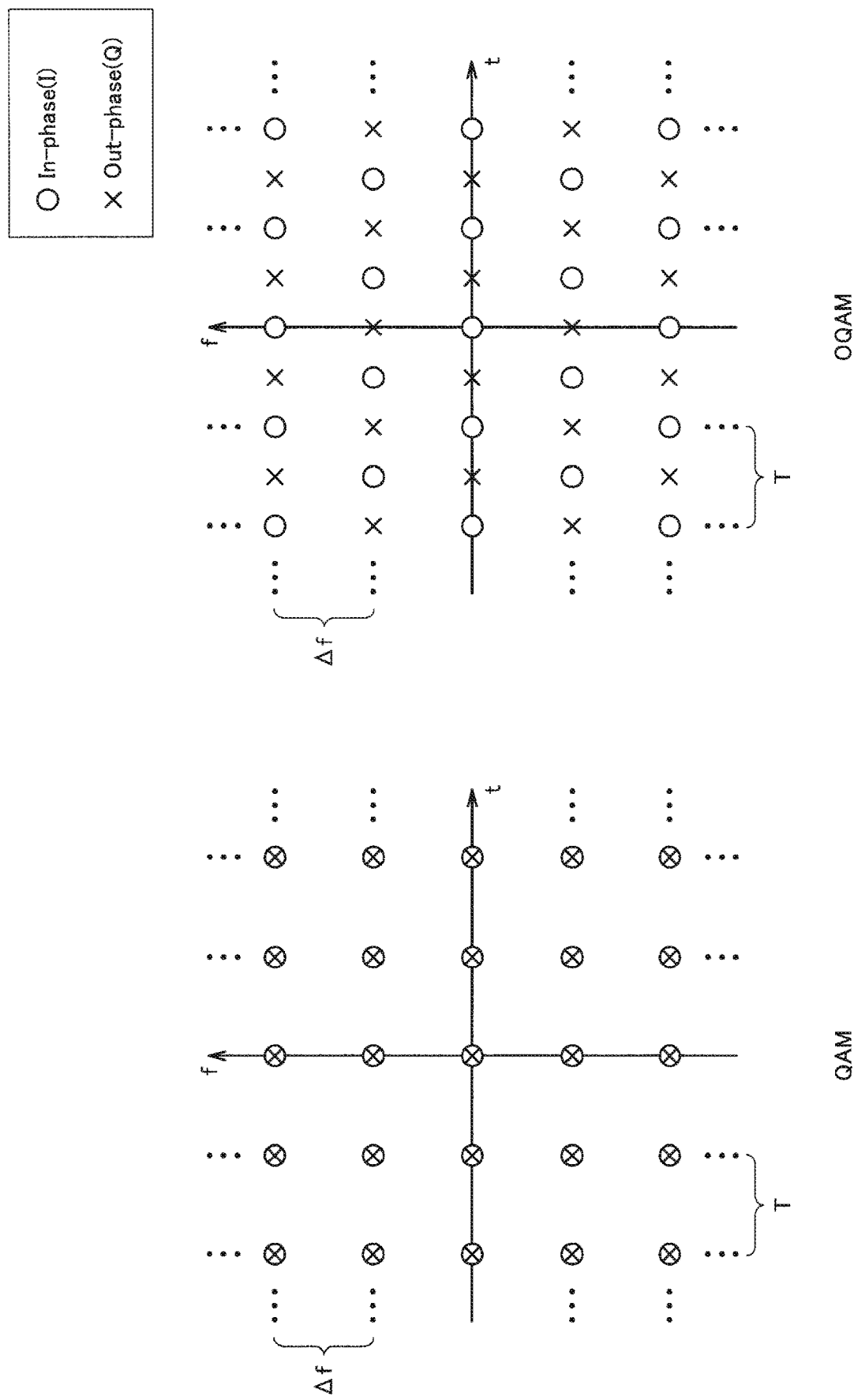
FIG. 5 is an explanatory diagram for explaining OQAM modulation.

Next, the OQAM modulation will be described with reference to FIG. 5. FIG. 5 is an explanatory diagram for explaining the OQAM modulation. In FIG. 5, the left diagram schematically shows an image of mapping of signals of a frequency direction and a time direction in the QAM modulation. In addition, the right diagram schematically shows the image of the mapping of the signals of the frequency direction and the time direction in the OQAM modulation. Note that, in both of the left and right diagrams of FIG. 5, a horizontal axis denotes time and a vertical axis denotes a frequency. In addition, in FIG. 5, a reference symbol T denotes an interval between symbols in the time direction (that is, a period of the symbol in the time direction). In addition, a reference symbol Δf denotes an interval between symbols in the frequency direction.

As shown in FIG. 5, in QAM, the in-phase component and the out-of-phase component are mapped so that each of the symbols of the in-phase component (in-phase (I)) and the out-of-phase component tout-phase (Q)) substantially coincides on a time-frequency axis. On the other hand, in the OQAM modulation, the in-phase component and the out-of-phase component are mapped so that the other shills by T/2 with respect to one of the in-phase component and the out-of-phase component.

(Communication Feature)

An inter-symbol interference (ISI) and inter-carrier interference (ICI) to feature or a TF localization feature is able to be satisfied without using a cyclic prefix (CP) by applying the OQAM modulation to the FBMC/OQAM method as described above.

Figure 6:
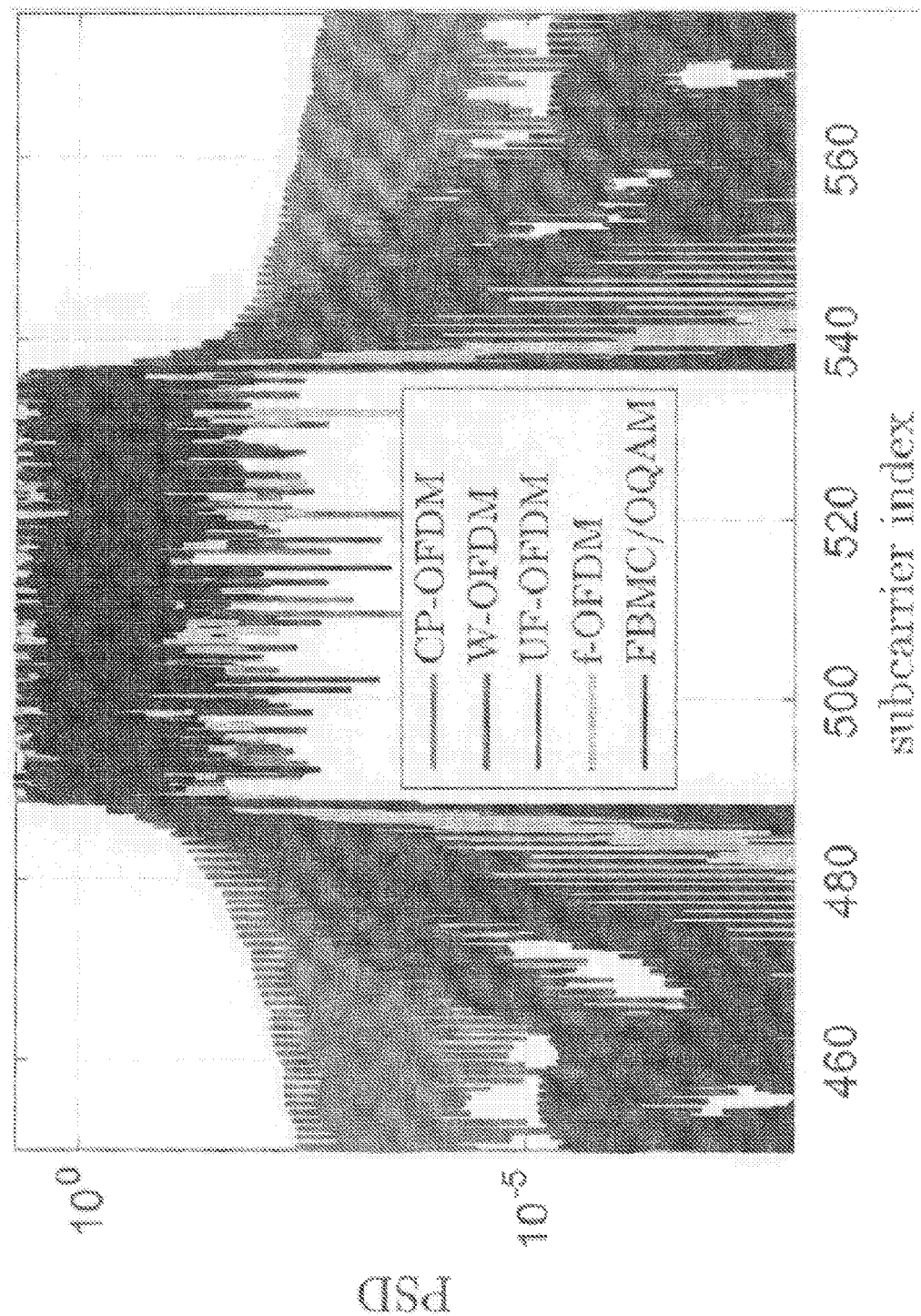
FIG. 6 is an explanatory diagram for explaining a feature of the FBMC/OQAM method.
Figure 7:
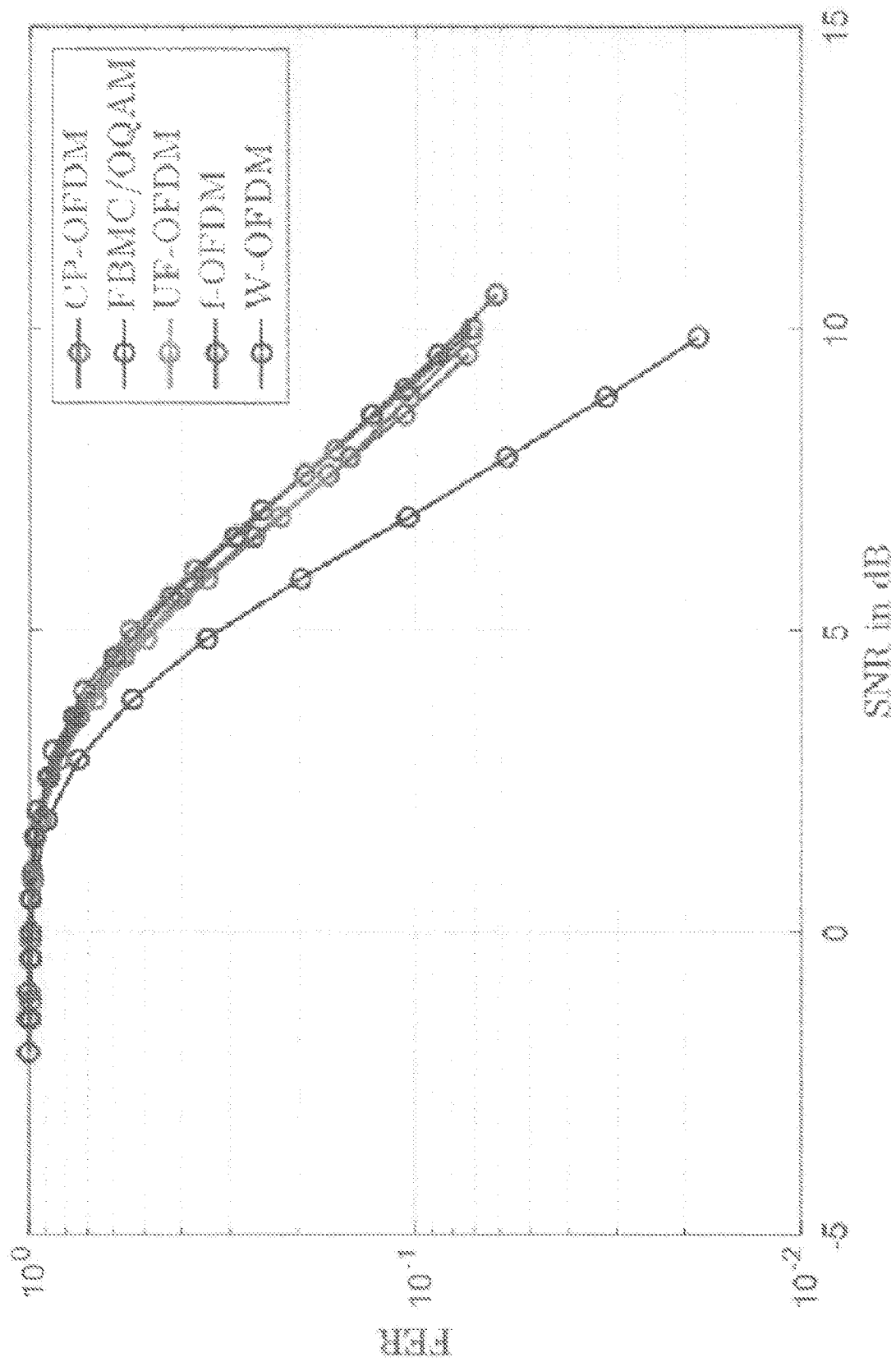
FIG. 7 is an explanatory diagram for explaining a feature of the FBMC/OQAM method.

For example, FIGS. 6 and 7 are explanatory diagrams for explaining the feature of the FBMC/OQAM method (source: 3GPP TSG RAN WG1 Meeting #84bis Busan, Korea, Apr. 11-15, 2016, NTT DOCOMO, INC. "Initial link level evaluation of waveforms"). Note that FIGS. 6 and 7 also show features of cyclic prefix OFDM (CP-OFDM), wideband OFDM (W-OFDM), universal filtered OFDM (UF-OFDM), and f-OFDM as comparison targets.

First, attention is paid to FIG. 6. FIG. 6 shows a feature of an out-of-band emission of the FBMC/OQAM method. In FIG. 6, a horizontal axis denotes a subcarrier index and a vertical axis denotes a power spectral density (PSD). As shown in FIG. 6, the FBMC/OQAM method is able to suppress the out-of-band emissions to a lower level than other methods. Therefore, it is expected that it will be possible to improve a frequency utilization efficiency and to further realize improvement of a communication capacity required in 5G by the application of the FBMC/OQAM method.

Next, attention is paid to FIG. 7. FIG. 7 shows a frame error rate (FER) feature of the FBMC/OQAM system. In FIG. 7, a horizontal axis denotes a value obtained by convening a signal-to-noise ratio (SNR) into decibels and a vertical axis denotes an FER. In the FBMC/OQAM method, since the filtering process is implemented for each subcarrier, a resistance to a carrier frequency offset (CFO) of the subcarrier is strong. Therefore, as shown in FIG. 7, it is possible to suppress deterioration of the FER to a lower level even in an environment in which a high speed Doppler shift of 500 km per hour or more required by 5G occurs with the application of the FBMC/OQAM method.

The FBMC/OQAM method that has been considered as one of the radio access technologies of the fifth generation mobile communication system following LTE/LTE-A has been described above with reference to FIGS. 1 to 7.

2. f-OFDM

Next, the f-OFDM method that has been considered as one of the radio access technologies of the fifth generation (5G) mobile communication system will be described with reference to FIGS. 8 to 11.

(Configuration of Transmission Device and Reception Device Based on CP-OFDM Method)

Figure 8:
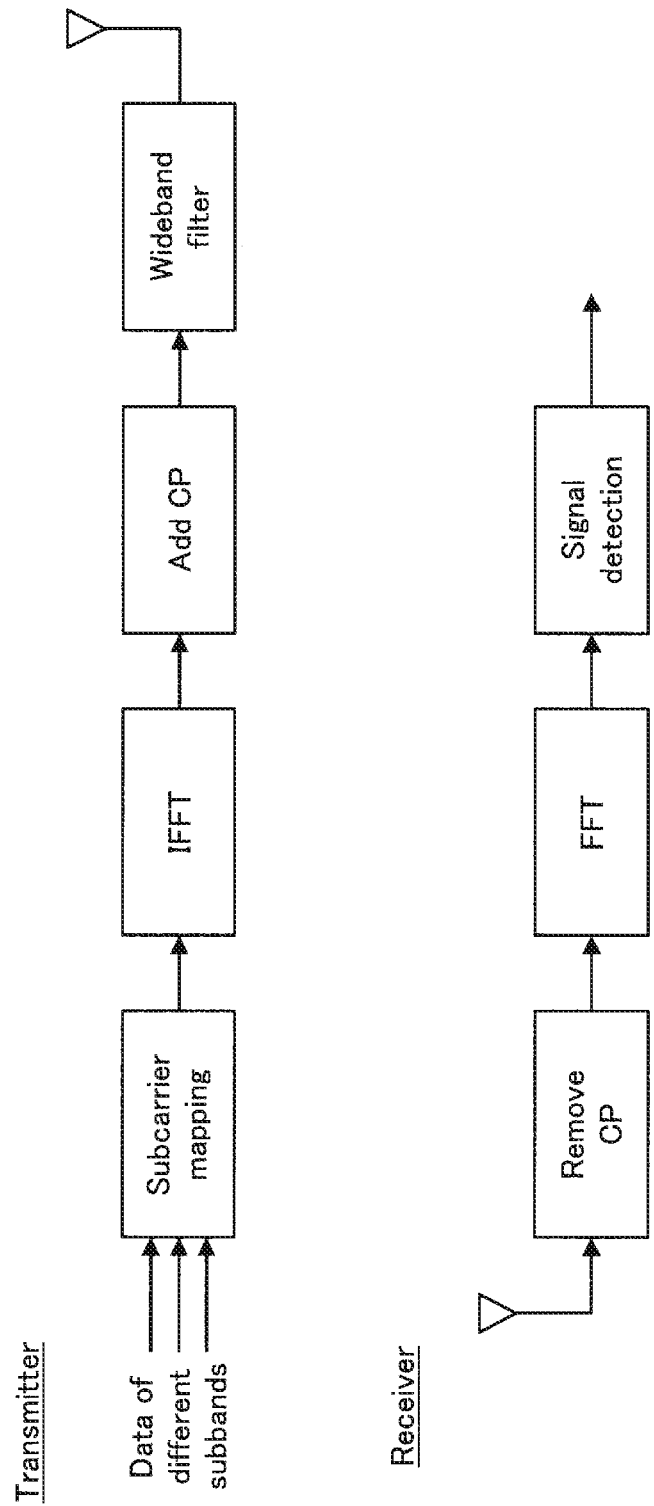
FIG. 8 is a block diagram illustrating an example of a schematic functional configuration of a transmission device and a reception device based on a CP-OFDM method.

First, in order to make a configuration of a transmission device and a reception device based on the f-OFDM method easier to understand, the configuration of the transmission device and the reception device based on the CP-OFDM method will be described. FIG. 8 is a block diagram illustrating an example of a schematic functional configuration of the transmission device and the reception device based on the CP-OFDM method. Note that, in FIG. 8, the upper diagram shows an example of the configuration of the transmission device, and the lower diagram shows an example of the configuration of the reception device.

First, the configuration of the transmission device will be described with reference to the upper diagram of FIG. 8. Several processes, for example, cyclic redundancy check (CRC) coding, forward error correction (FEC) coding, rate matching, and scrambling/interleaving are performed on a data stream for each sub-band, and then modulation is performed. In addition, layer mapping, power allocation, pre-coding, resource element mapping, and the like are performed on a bit stream after modulation. The data stream for each sub-band is mapped to the subcarrier by the above-described control.

Next, an inverse fast Fourier transform (IFFT) or inverse discrete Fourier transform (IDFT) process is implemented on the data stream mapped to the subcarrier, and after a CP is added, a filtering process by a wideband filter is implemented on the data stream mapped to the subcarrier. In addition, conversion from digital to analog and radio frequency (RF) and the like are performed on the data stream on which the filtering process is implemented and the data stream is transmitted from each antenna.

Next, the configuration of the reception device will be described with reference to the lower diagram of FIG. 8. For example, the signal received by each antenna is converted from the analog RF signal to a digital base band (BB) signal, and the added CP is removed. In addition, after a fast Fourier transform (FFT) or a discrete Fourier transform (DFT) is implemented on the signal from which the CP has been removed, processes related to detection of signals such as equalization and decoding are executed, and as a result, the data stream for sub band is obtained.

(Configuration of Transmission Device and Reception Device Based on f-OFDM Method)

Figure 9:
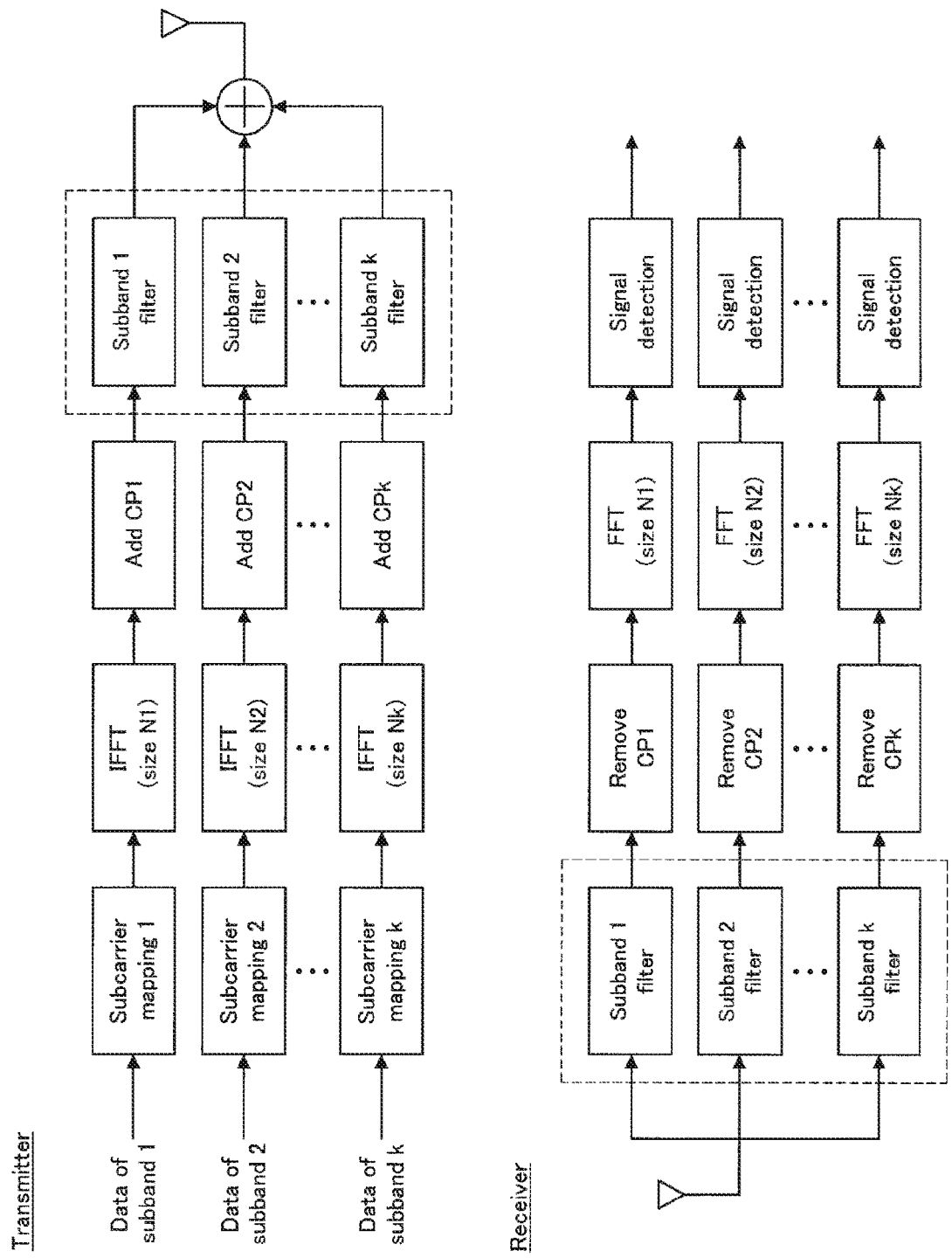
FIG. 9 is a block diagram illustrating an example of a schematic functional configuration of the transmission device and the reception device based on an f-OFDM method.

Next, the configuration of the transmission device and the reception device based on the f-OFDM method will be described with reference to FIG. 9. FIG. 9 is a block diagram illustrating an example of a schematic functional configuration of the transmission device and the reception device based on the f-OFDM method. Note that, in FIG. 9, the upper diagram shows an example of the configuration of the transmission device, and the lower diagram shows an example of the configuration of the reception device.

First, the configuration of the transmission device will be described with reference to the upper diagram of FIG. 9. As can be understood by comparing FIG. 8 with FIG. 9, the transmission device based on the f-OFDM method differs from the transmission device based on the CP-OFDM method in that a filter is provided for each sub-band. Note that the configuration located in the preceding stage of the filter provided for each sub-band is the same as that of the transmission device based on the CP-OFDM method described above with reference to FIG. 8.

Next, the configuration of the reception device will be described with reference to the lower diagram of FIG. 9. In the reception device based on the f-OFDM method, a filter is provided for each sub-band to correspond to the configuration of the transmission device side. Note that the filter provided for each sub-band is a configuration for implementing an inverse process of the filtering process by the filter corresponding to the sub-band on the transmission device side with respect to the received signal. Note that the configuration positioned in a subsequent stage the filter provided for each sub-band is the same as that of the reception device based on the CP-OFDM method described above with reference to FIG. 8.

That is, in the f-OFDM method, the OFDM modulation is performed on the basis of numerology parameters (for example, a subcarrier interval, a CP length, an OFDM symbol number, and the like) that differ for each sub-band, and filtering process based on filters that differ for each sub-band is implemented.

(Communication Feature)

Figure 10:
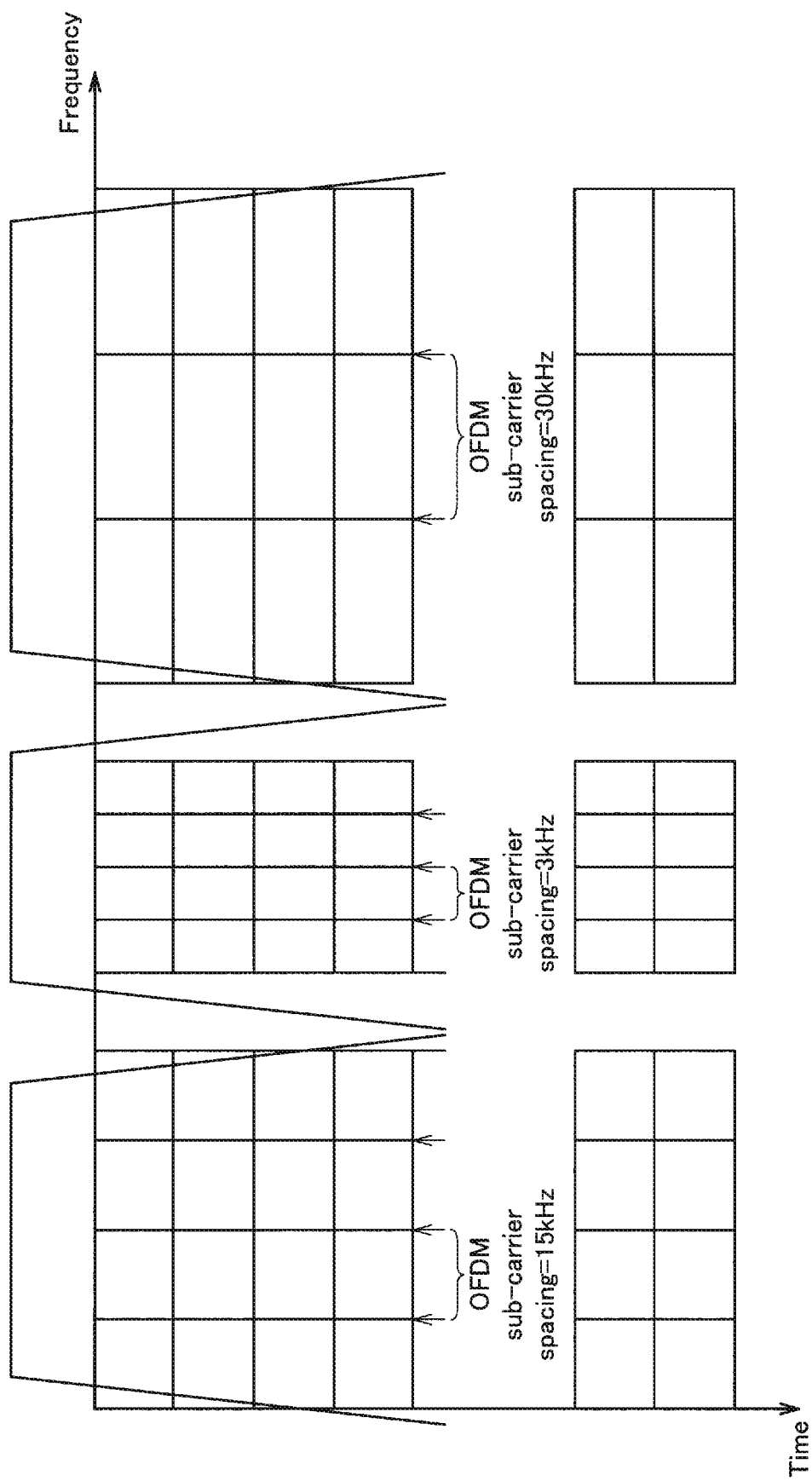
FIG. 10 is a diagram illustrating an example of mapping of an OFDM symbol based on the f-OFDM method.

In the f-OFDM method, communication methods with different data rates or latencies are able to simultaneously coexist on a time-frequency axis (T-F axis) in the configuration described above. For example, FIG. 10 is a diagram illustrating an example of mapping of an OFDM symbol based on the f-OFDM method. In FIG. 10, a horizontal axis denotes a frequency and a vertical axis denotes time. That is, in the example shown in FIG. 10, communication methods in which 15 kHz, 3 kHz, and 30 kHz are set as subcarrier intervals for each frequency band simultaneously coexist on the time-frequency axis.

In particular, in 5G three use cases of "enhanced mobile band," "Internet of things (IOT)," and "ultra-reliability low latency communication (URLLC)" are mainly assumed, and conditions (for example, data rate, latency, and the like) required for communication are also different for each use case. Even in such a situation, it is possible to cause communication to coexist according to requirements of each use case by the application of the f-OFDM method.

Figure 11:
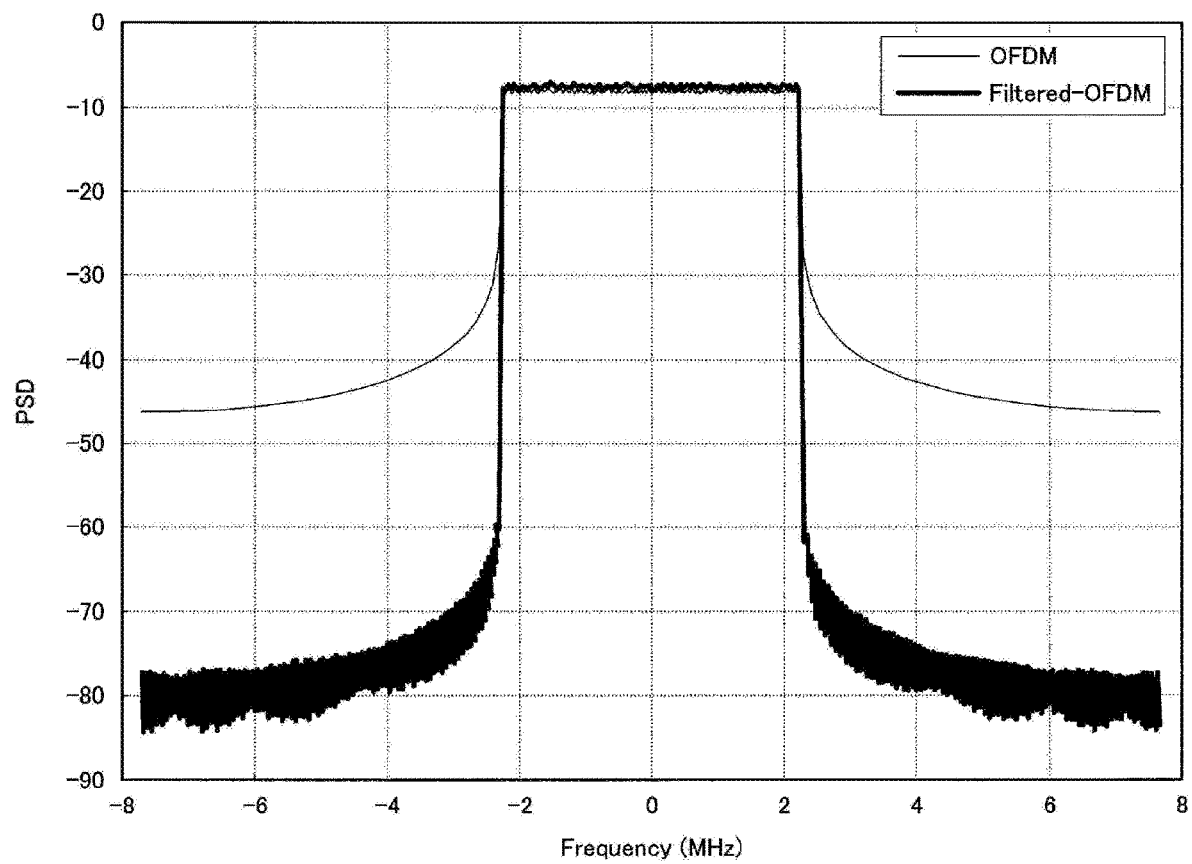
FIG. 11 is a diagram illustrating a feature of an out-of-band emission of the f-OFDM method.

In addition, FIG. 11 is a diagram illustrating the feature of the out-of-band emission of the f-OFDM method. In FIG. 11, a horizontal axis denotes a frequency and a vertical axis denotes a power spectral density. Note that FIG. 11 also shows a feature of a general OFDM method (that is, the CP-OFDM method) as a comparison target. As shown in FIG. 1, since the filtering process is performed for each sub-band in the f-OFDM method, it is possible to suppress the out-of-band emissions to a lower level than in the CP-OFDM method described above. Therefore, it is expected to be possible to improve a frequency utilization efficiency and to further realize improvement of a communication capacity required by 5G with the application of the f-OFDM method.

The f-OFDM method that has been considered as one of the radio access technologies of the fifth generation (5G) mobile communication system has been described above with reference to FIGS. 8 to 11.

3. Consideration of IQ Imbalance

Next, a technical issue of a communication device according to an embodiment of the present disclosure will be summarized while describing the IQ imbalance caused by imperfections of circuits (for example, various mixers and the like) for realizing modulation or demodulation of transmitted and received signals.

3.1. Double Balanced Mixer

First, in order to make it easier to understand factors causing the IQ imbalance, as an example of the circuit for realizing the modulation or demodulation of the transmitted and received signals, an outline of a double balanced mixer (Gilbert cell mixer) will be described with reference to FIGS. 12 to 14.

Figure 12:
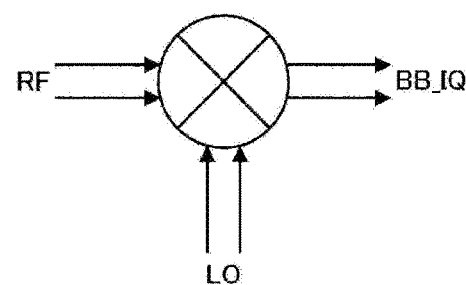
FIG. 12 is an explanatory diagram for explaining an outline of an operation of a double balanced mixer.
Figure 13:
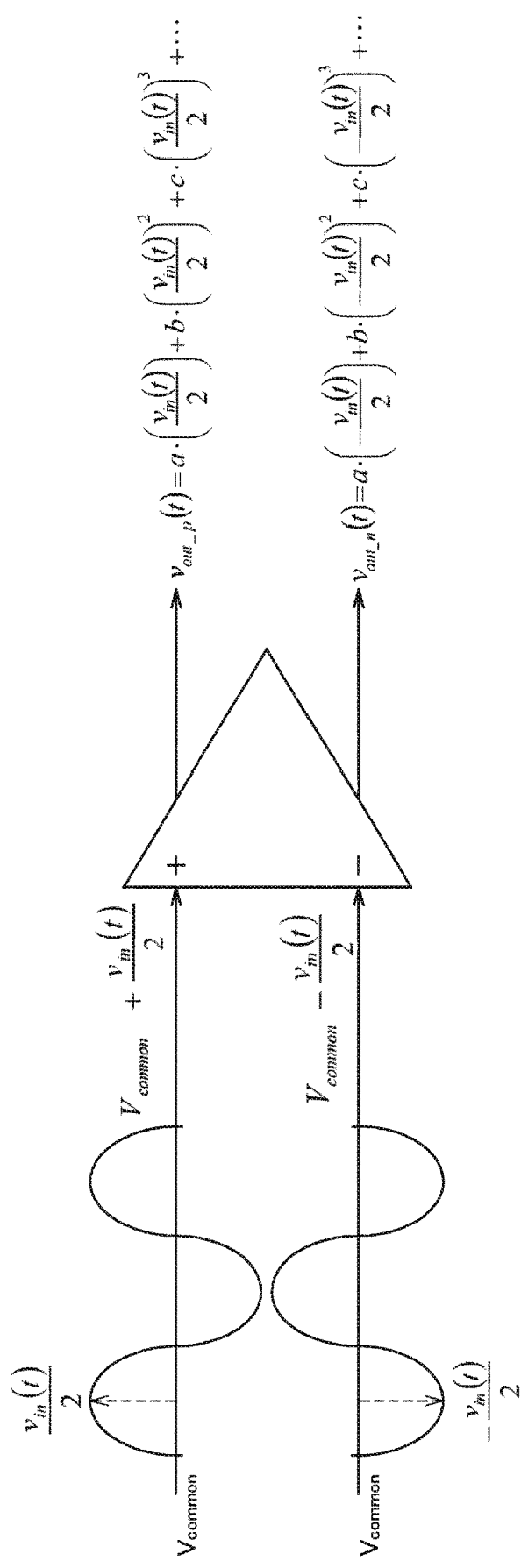
FIG. 13 is an explanatory diagram for explaining an outline of an operation of a double balanced mixer.
Figure 14:
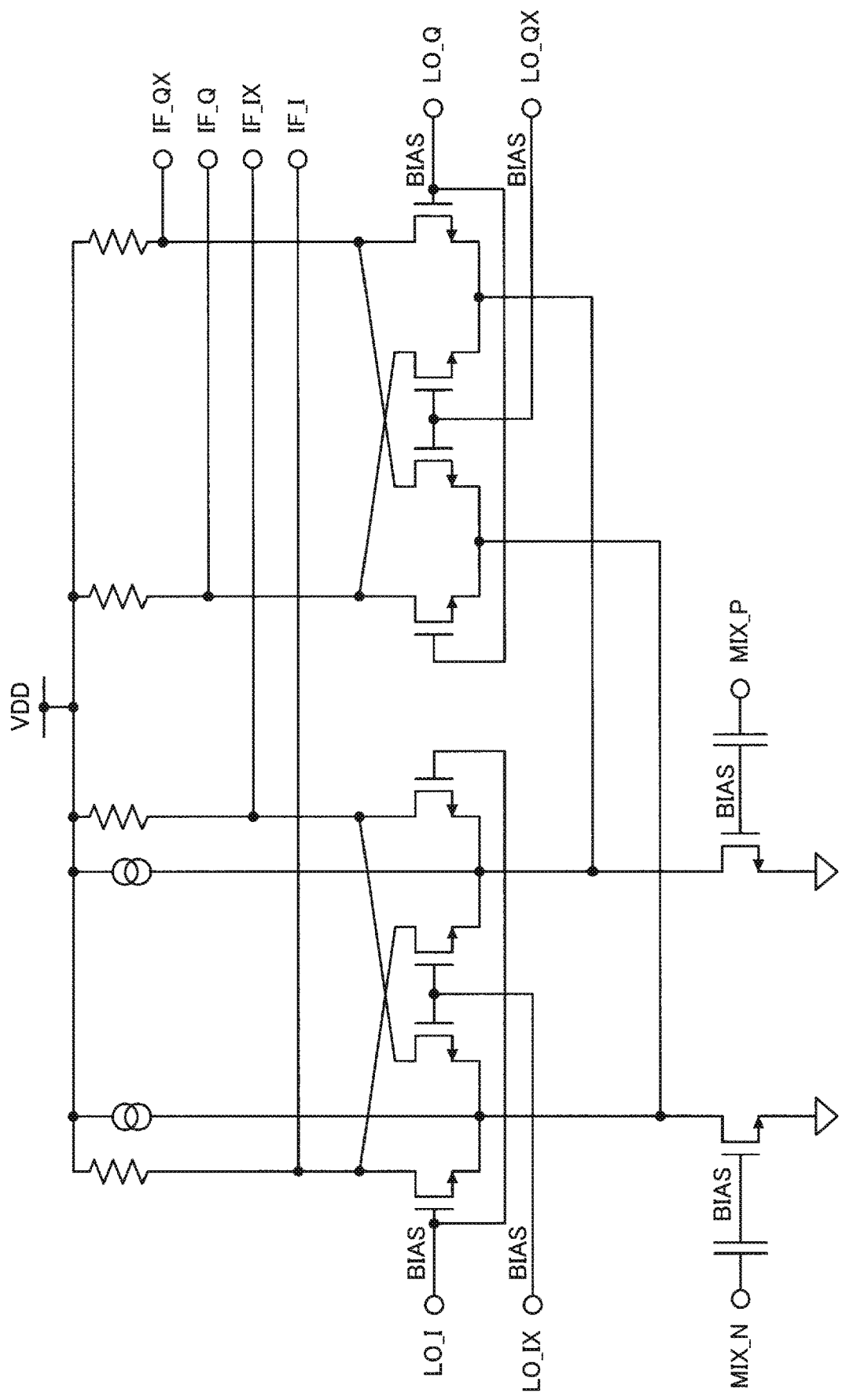
FIG. 14 is a diagram illustrating an example of a schematic circuit configuration in a case in which the double balanced mixer is mounted as an IC.

For example, FIGS. 12 and 13 are explanatory diagrams for explaining an outline of an operation of the double balanced mixer. As shown in FIG. 12, the double balanced mixer is a mixer configured to be able to differentially input the RF signal from the antenna and a signal LO from an oscillator or the like, and for example, is used for frequency conversion from the RF signal to BB signals, modulation or demodulation, or the like.

Here, an input and output signal model of a nonlinear system is expressed by the following relational formula shown as (Formula 1).

[Math. 1]

$$v_{out}(t) = a \cdot (v_{in}(t)) + b \cdot (v_{in}(t))^2 + c \cdot (v_{in}(t))^3 + \ldots \quad \text{(Formula 1)}$$

On the other hand, in the double balanced mixer, odd-number order distortion is canceled by the differential configuration. For example, FIG. 13 schematically illustrates the input and output signals in the double balanced mixer. In FIG. 13, $V_{common} + V_{in}(t)/2$ and $V_{common} - V_{in}(t)/2$ indicate input signals. In addition, $v_{out\_p}(t)$ indicates an output signal based on the input signal $V_{common} + V_{in}(t)/2$. In addition, $v_{out\_n}(t)$ indicates an output signal based on the input signal $V_{common} - V_{in}(t)/2$. On the basis of such a configuration, an output signal $v_{out}$ is expressed by the following relational formula shown as (Formula 2) by the differential configuration. Also from the following (Formula 2), it can be understood that the second order distortion is canceled by the differential configuration.

[Math. 2]

$$v_{out}(t) = v_{out\_p}(t) - v_{out\_n}(t) = a \cdot (v_{in}(t)) + \frac{c}{4} \cdot (v_{in}(t))^3 + \ldots \quad \text{(Formula 2)}$$

Due to the feature property described above, for example, in a complex down converter of the configuration of the double balanced mixer (Gilbert cell mixer), since the complex down converter is a completely differential configuration, there is theoretically no second order distortion due to nonlinearity (that is, IIP 2->+∞). Note that "IIP 2" indicates a secondary input interception point. Therefore, the double balanced mixer is resistant to baseband AM detection interference caused by Tx wave leakage of power amplifiers (PAs), and is applied to a direct conversion receiver (DCR) method (that is, a Zero-IF method).

Note that the double balanced mixer described above can be mounted as an integrated circuit (IC). For example, FIG. 14 is a diagram illustrating an example of a schematic circuit configuration in a case in which the double balanced mixer is mounted as the IC. As shown in FIG. 14, the double balanced mixer includes a combination of a plurality of transistors such as a metal-oxide-semiconductor field-effect transistor (MOSFET). In addition, a bias generated by a bias circuit is supplied to each transistor so that an operation point is an optimum feature.

3.2. Variation in Features Between Devices

Next, explanation will be given focusing on a variation in features between devices such as transistors that can be a factor in the IQ imbalance, particularly focusing on a variation in a threshold voltage of the transistors.

First, a structure of the MOS transistor, a manufacturing process of the MOS transistor, and a threshold voltage Vth will be described with reference to FIGS. 15 to 17 in order to make it easier to understand the variation of the threshold voltage Vth between the transistors.

Figure 15:
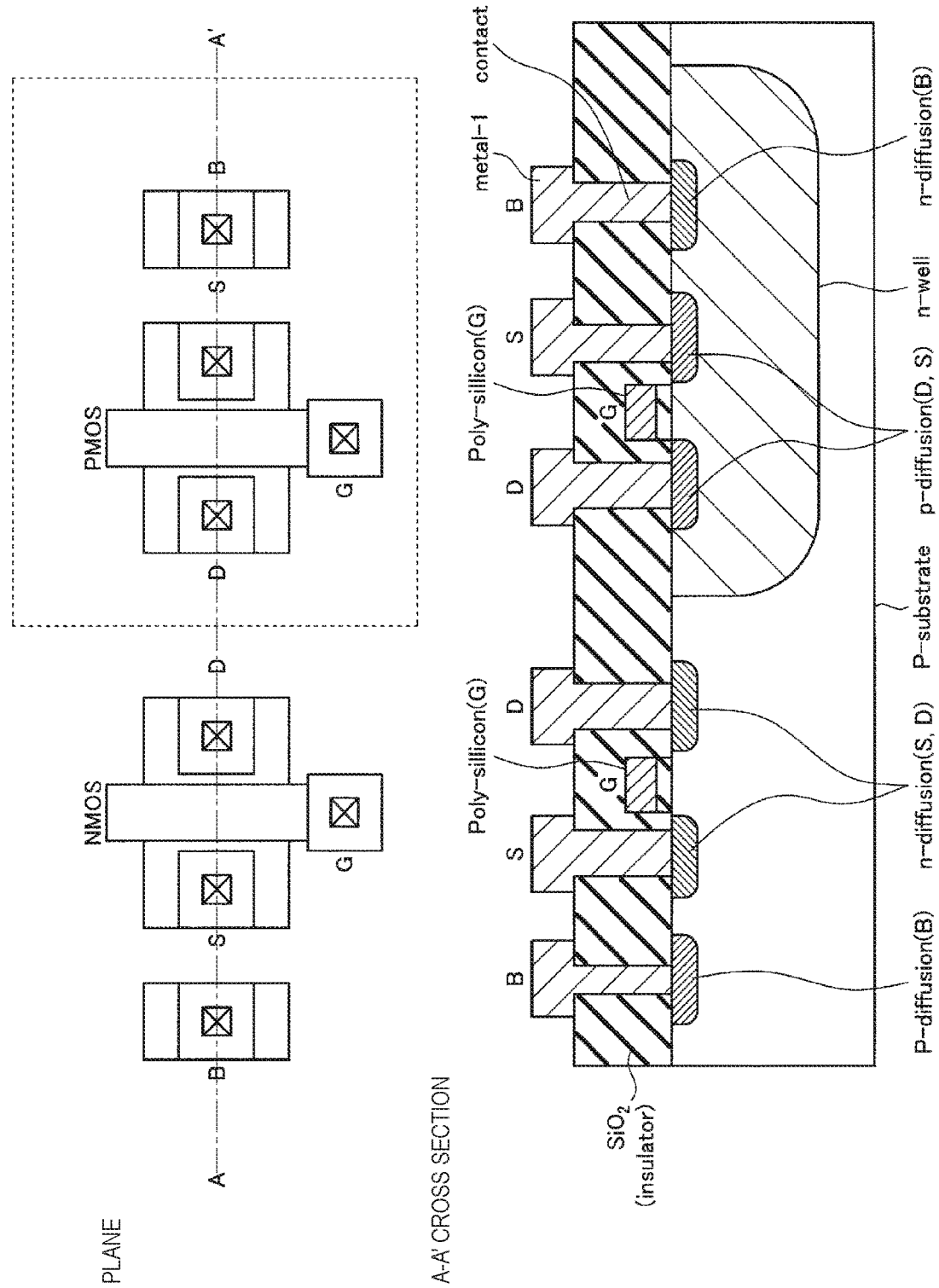
FIG. 15 is an explanatory diagram for explaining an example of a structure of a CMOS-FET.
Figure 16:
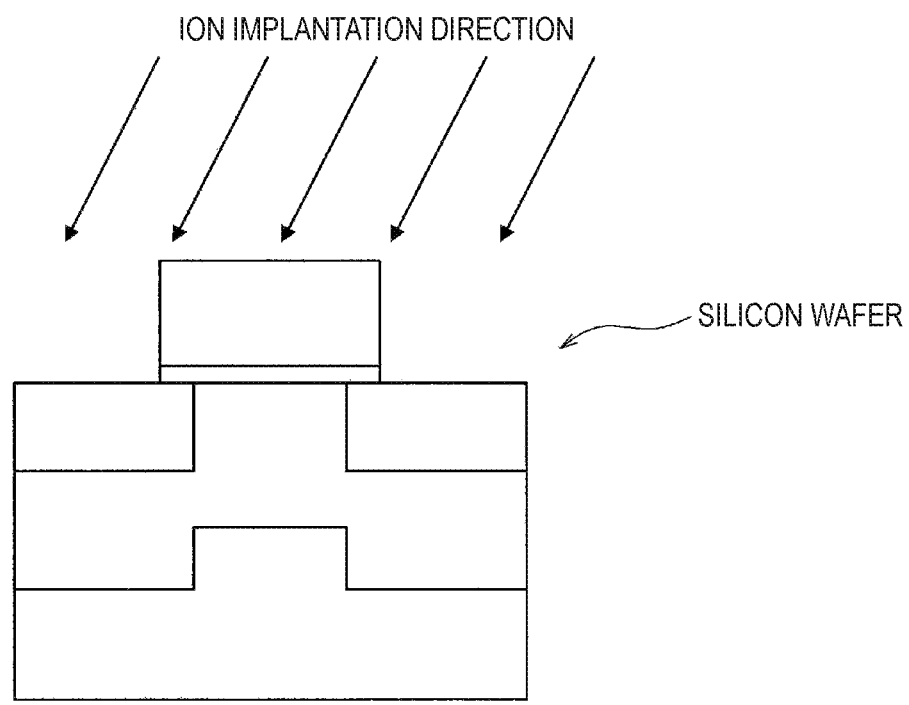
FIG. 16 is an explanatory diagram for explaining an outline of an ion implantation process.

For example, FIG. 15 is an explanatory diagram for explaining an example of a structure of a CMOS-FET. The upper view of FIG. 15 shows a plan view of the CMOS-FET.

In addition, the lower view of FIG. 15 shows a cross-sectional view of the CMOS-FET in a case in which the upper view of FIG. 15 is cut along the line A-A'.

Specifically the CMOS-FET is formed by forming an NMOS and a PMOS on a silicon substrate. For example, in the example shown in FIG. 15, the NMOS is formed on a P type substrate (P-substrate), an N type portion (N-well) is formed, and the PMOS is formed on the N type portion. Note that the N type portion is formed, for example, by locally ion-implanting the P type substrate. In addition, a gate electrode, a back gate electrode, a source region, a drain region, a contact, an insulating film, and the like are formed on each substrate (that is, the P type substrate or the N type portion), and thus each transistor (that is, the NMOS and the PMOS) is formed.

Here, the outline of the manufacturing process of the CMOS-FET will be described. The manufacturing process of the CMOS-FET mainly includes an "oxidation process," an "ion implantation process," an "impurity diffusion process," a "deposition process," a "photolithography process," and an "etching process." Note that since contents of each process are generally known, a detailed description will be omitted.

Among the above-described processes, there are cases in which a variation occurs in a distribution of donor and acceptor ions, particularly in the ion implantation process and the impurity diffusion process. For example, FIG. 16 is an explanatory diagram for explaining an outline of the ion implantation process. Generally, in a case in which a donor and an acceptor are implanted into a silicon wafer, oblique ion implantation in which a wafer is inclined by 7° with respect to an ion implantation direction is performed so that the channel is not formed along a crystal axis distribution of the silicon wafer. On the other hand, the implantation of the ions into the silicon wafer is not necessarily performed uniformly on the silicon wafer. Therefore, for example, on the silicon wafer, in a region in the vicinity of a center and a region in the vicinity of an end part, variation in a feature of a layer formed by the implantation of the ions may occur in some cases.

In addition, in the photolithography process and the etching process, for example, variation in a pattern (for example, a gate width and a gate length) of the gate electrode may occur due to variation in dimensions of a mask for forming the CMOS-FET in some cases.

Even in the same wafer, variation may occur in the device feature (for example, the threshold voltage Vth) of the formed CMOS-FET due to problems unique to the manufacturing process as described above. Note that the variation in the device feature described above tends to become more noticeable as a process of a miniaturization of the device (for example, the CMOS-FET) that is a target progresses.

Figure 17:
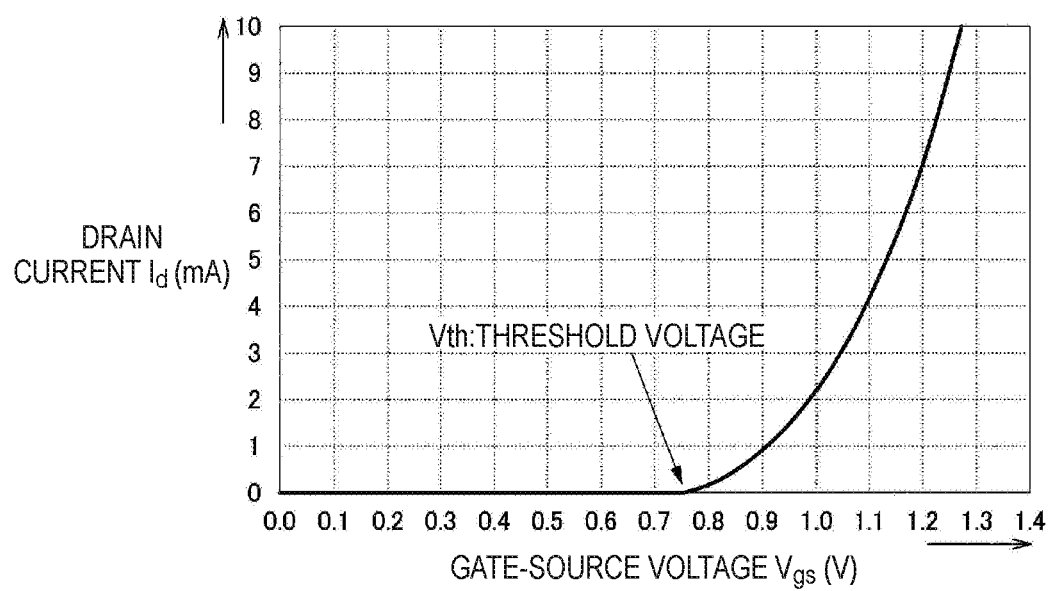
FIG. 17 is an explanatory diagram for explaining an example of a device feature of the CMOS-FET.

For example, FIG. 17 is an explanatory diagram for explaining an example of the device feature of the CMOS-FET, and shows an example of a relationship between a gate-source voltage Vgs and a drain current Id. In FIG. 17, a horizontal axis denotes the gate-source voltage Vgs(V), and a vertical axis denotes the drain current Id(mA). That is, in the example shown in FIG. 17, the threshold voltage Vth is about 0.75 V.

Figure 18:
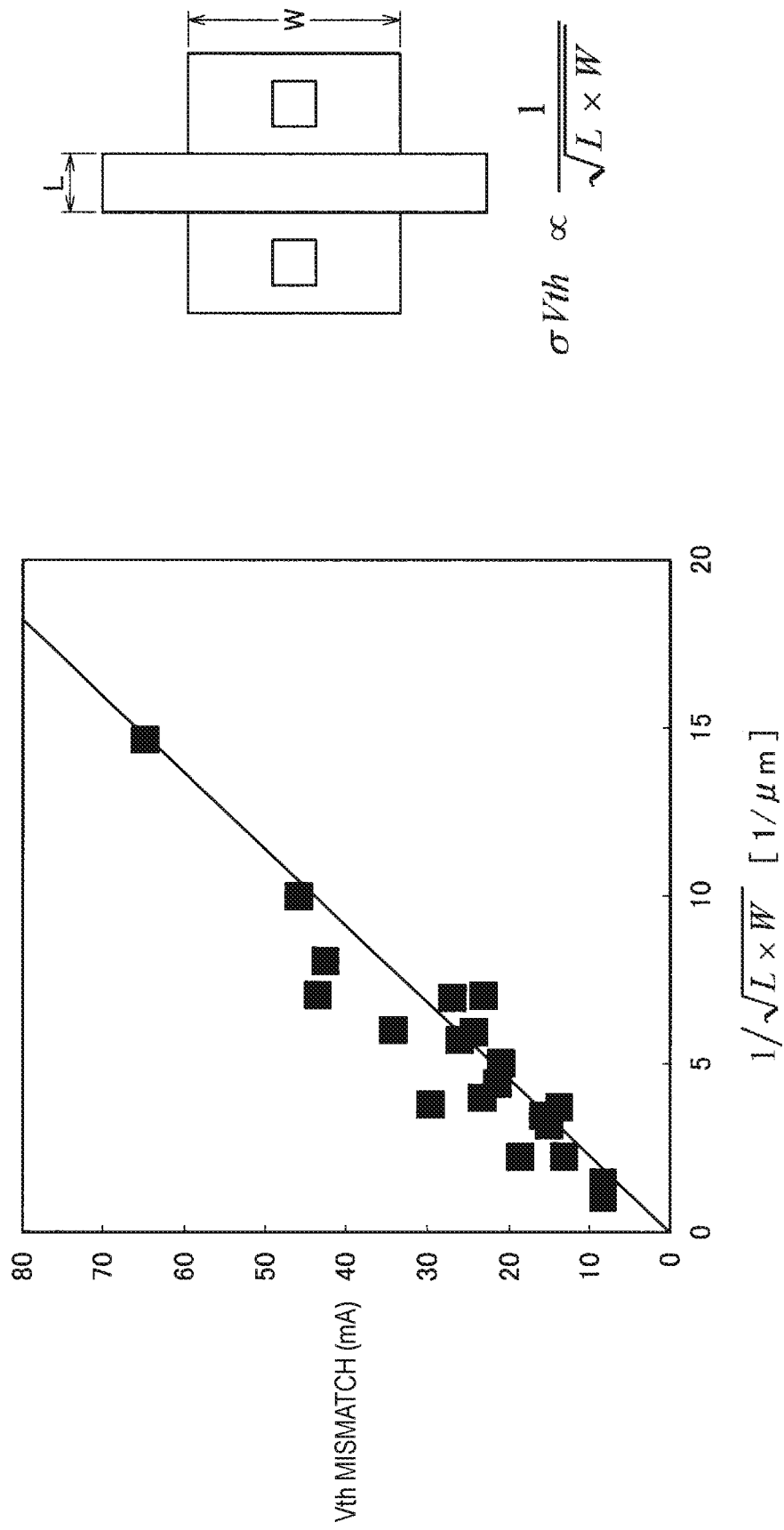
FIG. 18 is an explanatory diagram for explaining a relationship between a gate area in a MOSFET and a variation in a threshold voltage.

In addition, FIG. 18 is an explanatory diagram for explaining a relationship between a gate area (LW) in the MOSFET and a variation in the threshold voltage Vth. In FIG. 18, the right diagram schematically shows a structure of the MOSFET, and shows a gate length L and a gate width W. In addition, the left diagram is a graph showing the relationship between the gate area (LW) and the variation in the threshold voltage Vth. In the left diagram of FIG. 18, a horizontal axis indicates a transistor size $(1/(L/W)^{1/2} (1/\mu m))$ and a vertical axis indicates a mismatch (mV) of the threshold voltage Vth. Note that the threshold voltage Vth tends to be proportional to the transistor size $(1/(L \times W)^{1/2})$. That is, a straight line shown in the left diagram of FIG. 18 shows the feature in an ideal state, that is, the relationship between the transistor size and the mismatch of the threshold voltage Vth.

As shown in FIG. 18, samples (plots) showing the features of the respective MOSFETs do not necessarily coincide with the features in the ideal state, and it is understood that the variation in the threshold voltage Vth between the MOSFETs occurs as a result of this.

The variation in the features between the devices such as transistors has been described above, particularly focusing on the variation in the threshold voltage Vth of the transistors.

3.3. Technical Problem

Next, a technical problem of a communication device according to an embodiment of the present disclosure will be described. For example, in a case in which the variation occurs in the threshold voltage Vth as described above between the transistors included in the IC, a deviation occurs in an operation point of the transistor. For example, IQ imbalance occurs due to such a deviation in the operation point of the transistor, and thus it is difficult to obtain an optimal feature as an operation of the IC in some cases.

In response to such a problem, for example, an influence of the variation in the threshold voltage Vth between the transistors is reduced by devising circuit configurations, process selection, or the like in some cases. For example, FIGS. 19 and 20 are explanatory diagrams for explaining an example of an IC layout for reducing mismatch in a pair of MOS transistors.

Specifically FIG. 19 shows an example of an IC layout in which a comb layout and a common centroid disposition are combined. In FIG. 19, the left diagram shows a schematic configuration of a circuit mounted as an IC, and the right diagram shows an example of an IC layout in a case in which the circuit is mounted as the IC.

Figure 20:
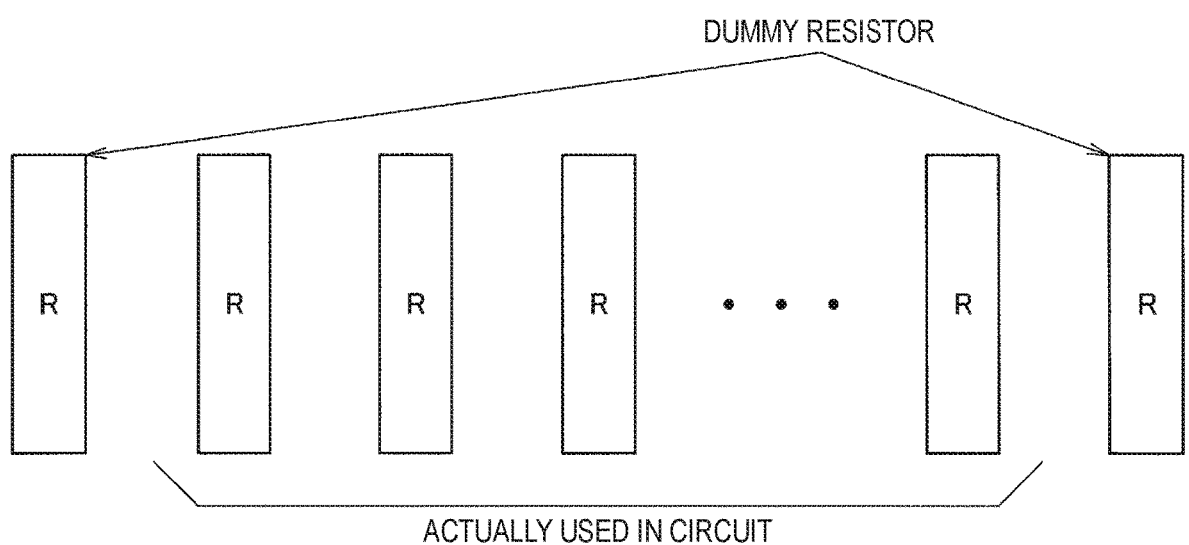
FIG. 20 is an explanatory diagram for explaining an example of an IC layout for reducing mismatch in a pair of MOS transistors.

In addition, FIG. 20 shows an example of an IC layout for improving resistance ratio matching by disposition of a dummy resistor. In a case in which attention is paid to a series of resistors R arranged as shown in FIG. 20, physical conditions (process conditions) are different between resistors R positioned at both ends and resistors R positioned at an inner side, and accurate resistance ratio matching becomes difficult. In consideration of such a situation, for example, it is possible to improve the resistance ratio matching by adding the dummy resistors that are not actually used at both ends and using only the resistor R positioned at the inner side that is sandwiched between the dummy resistors.

However, in the situation in which the variation in the threshold voltage Vth between the transistors occurs, as shown in FIG. 1, the features of each transistor are different for each transistor. That is, the influence of IQ imbalance varies for each IC according to the features of each transistor used for configuring the IC. Therefore, it is extremely difficult to completely suppress the influence of the variation in the threshold voltage Vth between the transistors through planning at the time of design of the IC layout and the like. In response to this, for example, it is theoretically possible to reduce the influence due to the variation in the features between the transistors by selecting and using transistors having an ideal feature, but it is difficult to realize reduction in the influence due to the variation in practice.

In particular, it is understood that, in the FBMC method (the OFDM/OQAM method) described above, the influence of the IQ imbalance (for example, signal deterioration) in a direct-conversion receiver (DCR) chip tends to be larger than that of the existing CP-OFDM method.

In addition, since the number of signal points increases according to multi-valuing by PSK, QAM, or the like, the influence of the 1Q imbalance on the BER feature also tends to be larger.

As a specific example, in a case in which attention is paid to the CP-OFDM, an IQ gain imbalance related to a gain among IQ impulses in a case in which the feature deteriorates by 3 dB from an ideal bet error rate (BER) feature at the time of 16 QAM modulation is 1.12 dB. In addition, an IQ phase imbalance related to out-of-phase is 7.5 deg among the IQ imbalances. On the other hand, the IQ gain imbalance is 0.55 dB and the IQ phase imbalance is 3.5 deg in a case where the feature deteriorates by 3 dB from the ideal BER feature at the time of 64 QAM modulation.

In particular, in the f-OFDM method, in a case in which the requirement of a peak data rate at 5G is considered, further multi-valuing is required as compared with the CP-OFDM method. Therefore, the influence of the IQ imbalance on the BER feature is also larger than that of the CP-OFDM method.

In addition, in recent years, there has been a tendency for the IC to be further miniaturized, and it is known that the influence of the IQ imbalance becomes larger as the IC becomes miniaturized. Therefore, regardless of differences in communication methods, it may be assumed that the influence of the IQ imbalance will become noticeable due to the miniaturization of the IC.

In consideration of such a situation, the present disclosure proposes an example of a mechanism for correcting IQ imbalance caused by a variation in features between devices in a more preferable aspect. Note that, hereinafter, the communication device according to an embodiment of the present disclosure will be described in more detail.

4. Configuration Example

4.1. Configuration Example of System

Figure 21:
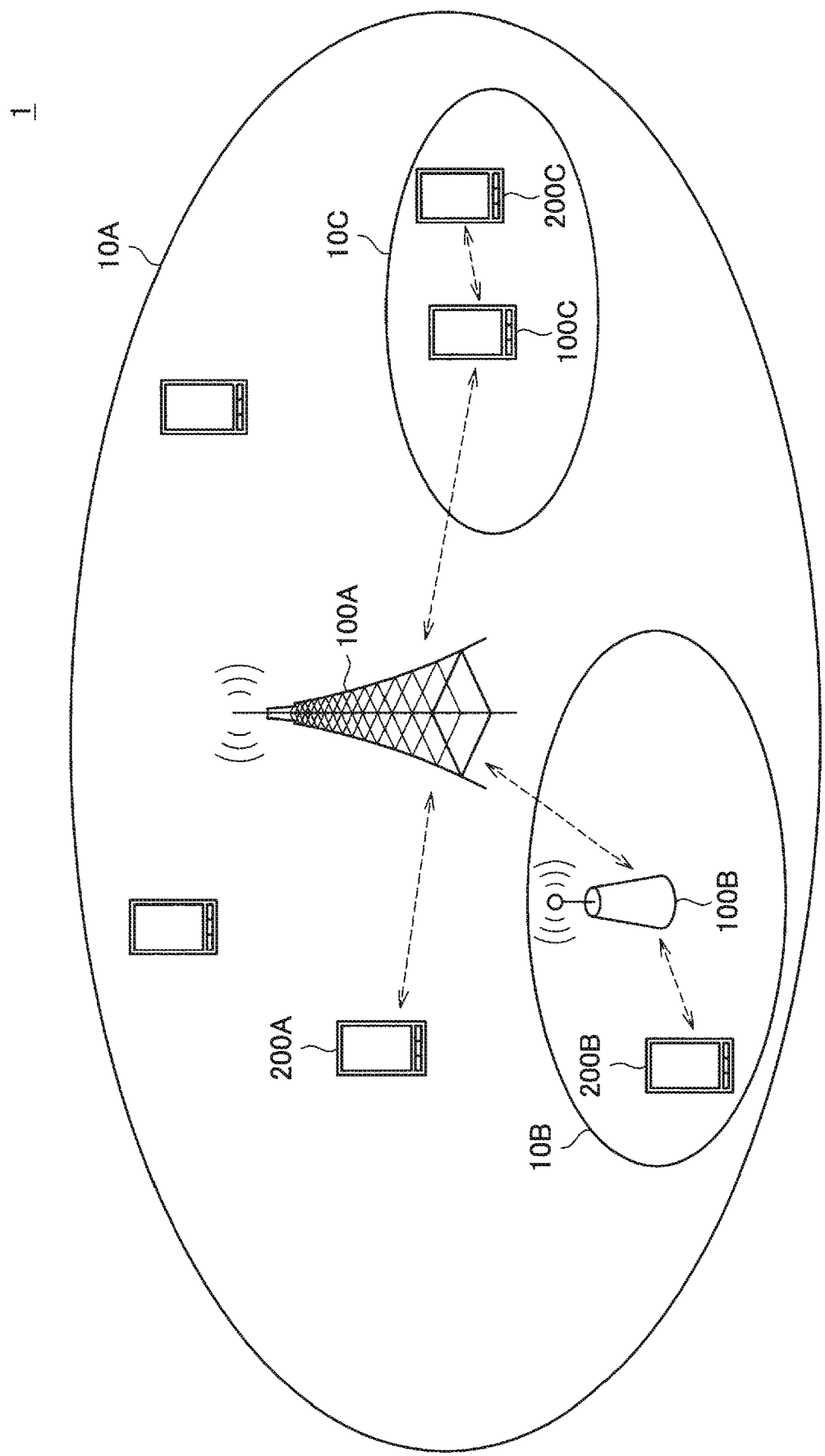
FIG. 21 is an explanatory diagram for explaining an example of a schematic configuration of a system according to an embodiment of the present disclosure.

First, an example of a schematic configuration of a system 1 according to an embodiment of the present disclosure will be described with reference to FIG. 21. FIG. 21 is an explanatory diagram for explaining an example of the schematic configuration of the system 1 according to an embodiment of the present disclosure. As shown in FIG. 21, the system 1 includes a wireless communication device 100 and a terminal device 200. Here, the terminal device 200 is also referred to as a user. The user may also be referred to as a UE. The wireless communication device 100C is also referred to as a UE-relay. Here, the UE may be a UE defined in the LTE or the LTE-A. The UE-relay may be Prose UE to Network Relay being discussed in 3GPP, and more generally may mean communication apparatus.

(1) Wireless Communication Device 100

The wireless communication device 100 is a device that provides a wireless communication service to a device under control thereof. For example, the wireless communication device 100A is a base station of a cellular system (or a mobile communication system). The base station 100A performs wireless communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station by, for example, an X2 interface, and is able to transmit and receive control information and the like. In addition, the base station 100A is logically connected to a so-called core network (not shown) by, for example, an S1 interface, and is able to transmit and receive control information and the like. Note that the communication between these devices is able to be physically relayed by various devices.

Here, the wireless communication device 100A shown in FIG. 21 is a macro cell base station, and the cell 100A is a macro cell. On the other hand, wireless communication devices 100B and 100C are master devices that operate small cells 10B and 10C, respectively. As an example, the master device 100B is a small cell base station that is fixedly installed. The small cell base station 100B establishes a wireless backhaul link with the macro cell base station 100A and an access link with one or more terminal devices (for example, the terminal device 200B) in the small cell 10B, respectively. Note that the wireless communication device 100B may be a relay node defined by 3GPP. The master device 100C is a dynamic access point (AP). The dynamic AP 100C is a mobile device that dynamically operates the small cell 10C. The dynamic AP 100C establishes a wireless backhaul link with the macro cell base station 100A and an access link with one or more terminal devices (for example, the terminal device 200C) in the small cell 10C. The dynamic AP 100C may be, for example, a terminal device on which hardware or software that is able to be operated as a base station or a wireless access point is mounted. The small cell 10C of this case is a dynamically formed localized network/virtual cell.

The cell 10A may be operated according to any wireless communication method such as LTE, LTE-advanced (LTE-A), GSM (registered trademark), UMTS, W-CDMA, CDMA 200, WiMAX, WiMAX2, or IEEE 802.16. In addition, the cell 10A may be operated according to a wireless communication method such as the FBMC/OQAM, the f-OFMD, or the like described above. Of course, these wireless communication methods are merely examples, and the wireless communication method for operating the cell 10A is not necessarily limited.

Note that the small cell is a concept that is able to include various types of cells (for example, a femto cell, a nano cell, a pico cell, a micro cell, and the like) that are smaller than a macro cell, that are disposed overlapping or not overlapping with the macro cell. In one example, the small cell is operated by a dedicated base station. In another example, the small cell is operated by temporarily operating a terminal that is served as a master device, as a small cell base station. A so-called relay node is also able to be regarded as a form of the small cell base station. A wireless communication device functioning as a master station of the relay node is also referred to as a donor base station. The donor base station may mean DeNB in the LTE, and may more generally mean the master station of the relay node.

(2) Terminal Device 200

The terminal device 200 is able to perform communication in a cellular system (or a mobile communication system). The terminal device 200 performs to wireless communication with the wireless communication device (for example, the base station 100A, and the master device 100B or 100C) of the cellular system. For example, the terminal device 200A receives the downlink signal from the base station 100A and transmits the uplink signal to the base station 100A.

(3) Supplement

Although the schematic configuration of the system 1 has been described above, the present technique is not limited to the example shown in FIG. 21. For example, as a configuration of the system 1, a configuration that does not include a master device, small cell enhancement (SCE), a heterogeneous network (HetNet), a machine type communication (MTC) network, or the like is able to be adopted.

4.2. Configuration Example of Base Station

Figure 22:
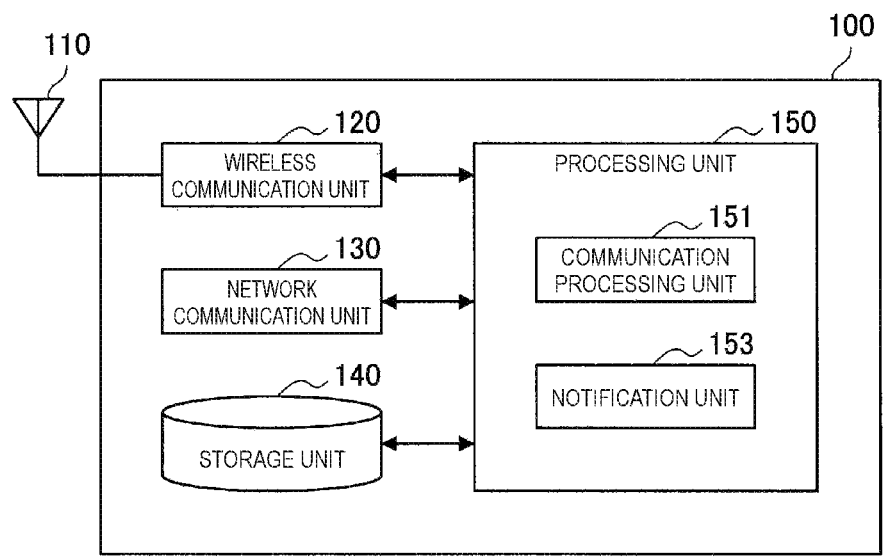
FIG. 22 is a block diagram illustrating an example of a configuration of a base station according to the embodiment.

Next, the configuration of the base station 100 according to an embodiment of the present disclosure will be described with reference to FIG. 22. FIG. 22 is a block diagram illustrating an example of the configuration of the base station 100 according to an embodiment of the present disclosure. Referring to FIG. 22, the base station 100 includes an antenna unit 110, a wireless communication unit 120, a network communication unit 130, a storage unit 140, and a processing unit 150.

(1) Antenna Unit 110

The antenna unit 110 radiates a signal output from the wireless communication unit 120 to a space as a radio wave. In addition, the antenna unit 110 converts the radio wave in the space into a signal and outputs the signal to the wireless communication unit 120.

(2) Wireless Communication Unit 120

The wireless communication unit 120 transmits and receives a signal. For example, the wireless communication unit 120 transmits the downlink signal to the terminal device and receives the uplink signal from the terminal device.

(3) Network Communication Unit 130

The network communication unit 130 transmits and receives information. For example, the network communication unit 130 transmits the information to another node and receives the information from the other node. For example, the other node includes another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a communication processing unit 151 and a notification unit 153. Note that the processing unit 150 may further include other components in addition to these components. That is, the processing unit 150 is also able to perform an operation in addition to the operations of these components.

The communication processing unit 151 generates a transmission signal (the downlink signal) by implementing a modulation process on data that is a transmission target on the basis of a predetermined communication method, and performs control so that the generated downlink signal is transmitted to the terminal device 200 in the cell from the wireless communication unit 120. In addition, at this time, the communication processing unit 151 may map various reference signals to predetermined wireless resources of the downlink signal. In addition, for example, with respect to the communication method used by the wireless communication twit 120, the communication processing unit 151 may set the wireless communication unit 120 so as to perform wireless communication using a spatial area, a power area, an interleaver area, a data rate area, or a sparse code area allocated by the core network node.

In addition, the communication processing unit 151 may demodulate the data transmitted from the terminal device 200 by implementing a demodulation process on the uplink signal from the terminal device 200 in the cell received by the wireless communication unit 120 on the basis of a predetermined communication method.

The notification unit 153 notifies the terminal device 200 of various pieces of information. Specifically, the notification unit 153 may distribute various messages or various kinds of control information to the terminal devices 200 in the cell, for example, as system information or downlink control information (DCI). As a specific example, the notification unit 153 may distribute mapping information of a predetermined reference signal to the terminal devices 200 in the cell.

4.3. Configuration Example of Terminal Device

Figure 23:
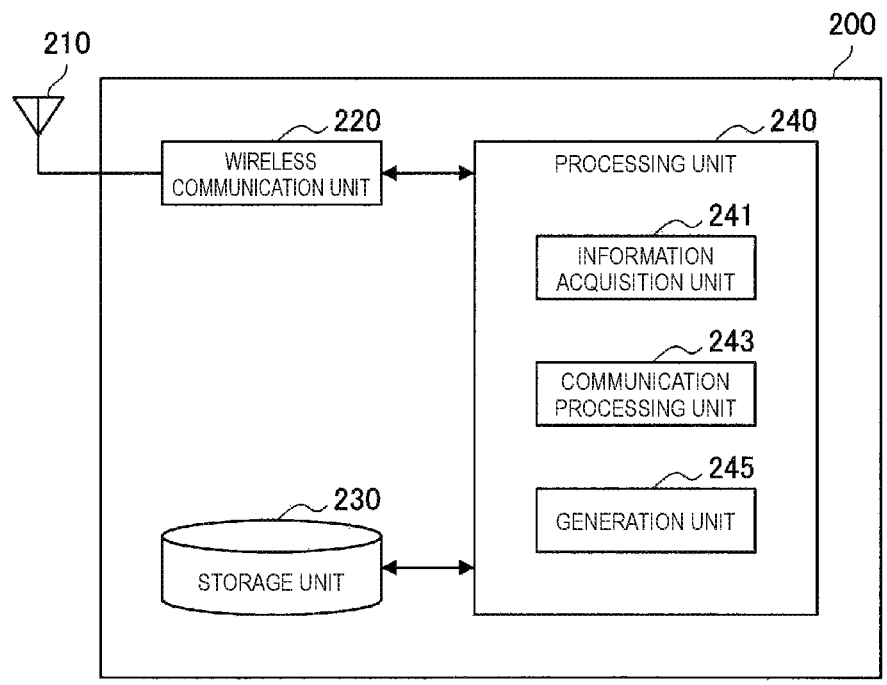
FIG. 23 is a block diagram illustrating an example of a configuration of a terminal device according to the embodiment.

Next, an example of the configuration of the terminal device 200 according to an embodiment of the present disclosure will be described with reference to FIG. 23. FIG. 23 is a block diagram illustrating the example of the configuration of the terminal device 200 according to an embodiment of the present disclosure. As shown in FIG. 23, the terminal device 200 includes an antenna unit 210, a wireless communication unit 220, a storage unit 230, and a processing unit 240.

(1) Antenna Unit 210

The antenna unit 210 radiates a signal output by the wireless communication unit 220 to a space as a radio wave. In addition, the antenna unit 210 converts the radio wave in the space into a signal and outputs the signal to the wireless communication unit 220.

(2) Wireless Communication Unit 220

The wireless communication unit 220 transmits and receives a signal. For example, the wireless communication unit 220 receives the downlink signal from the base station and transmits the uplink signal to the base station.

(3) Storage Unit 230

The storage unit 230 temporarily or permanently stores a program and various data for operation of the terminal device 200.

(4) Processing Unit 240

The processing unit 240 provides various functions of the terminal device 200. For example, the processing unit 240 includes an information acquisition unit 241, a communication processing unit 243, and a generation unit 245. Note that the processing unit 240 may further include other components in addition to these components. That is, the processing unit 240 is also able to perform an operation in addition to the operations of these components.

The information acquisition unit 241 acquires predetermined information on the basis of the system information or the downlink control information distributed from the base station 100. For example, the information acquisition unit 241 may acquire the mapping information of the various reference signals mapped to the downlink signal on the basis of the system information and the downlink control information distributed from the base station 100. In addition, at this time, the information acquisition unit 241 may recognize the reference signal mapped to the downlink signal on the basis of the mapping information of the various reference signals acquired from the base station 100, and may acquires various kinds of information on the basis of a reception result of the reference signal.

The communication processing unit 243 demodulates the data transmitted from the base station 100 by implementing a demodulation process on the downlink signal from the base station 100 received by the wireless communication unit 220 on the basis of a predetermined communication method. At this time, the communication processing unit 243 may correct (calibrate) the IQ imbalance of the received downlink signal on the basis of correction data that will be described later. Note that a part for correcting the IQ imbalance of the communication processing unit 243 corresponds to an example of a "correction unit".

In addition, the communication processing unit 243 may generate a transmission signal (the uplink signal) by implementing a modulation process on data that is a transmission target on the basis of a predetermined communication method, and may perform control so that the generated uplink signal is transmitted to the base station 100 from the wireless communication unit 220.

The generation unit 245 Generates correction data for correcting the IQ imbalance that occurs according to the feature of the device included in a circuit for realizing modulation and demodulation of a signal to be transmitted and received, on the basis of a reception result of a predetermined reference signal (reference signal). The generation unit 245 may hold the generated correction data in a predetermined storage region (for example, the storage unit 230). Note that details of the generation unit 245 will be described later.

Note that the above-described configuration is merely an example, and the functionality of the terminal device 200 is not necessarily limited. For example, at least part of the configuration of the terminal device 291K may be provided outside the terminal device 200. More specifically, the generation unit 245 may be attached to the outside as a device separate from the terminal device 200 in this case, a device provided with the generation unit 245 corresponds to an example of an "information processing device" for generating the correction data.

5. Technical Feature

Next, the technical feature of an embodiment of the present disclosure will be described. The terminal device 200 according to the present embodiment generates the correction data for correcting the IQ imbalance on the basis of the reception result of the predetermined reference signal used in the downlink. Specifically, the terminal device 200 uses the reception result of the reference signal on which the phase modulation or the quadrature amplitude modulation is implemented in generating the correction data. Therefore, hereinafter, an example of the reference signal used by the terminal device 200 according to the present embodiment to generate the correction data will be described, and details of a process related to the generation of the correction data will be described.

5.1. Reference Signal

Various reference signals for downlink are transmitted in the downlink signal of the LTE that is the fourth generation (4G) communication method. As a specific example, there are the following reference signals.
PSS: primary synchronization signal
SSS: secondary synchronization signal
CS-RS: cell-specific reference signal
CSI-RS: channel state information reference signal The PSS and the SSS are reference signals used for the terminal device 200 to search the base station 100 and to establish synchronization, for example, at a time of power-on or the like.

Figure 24:
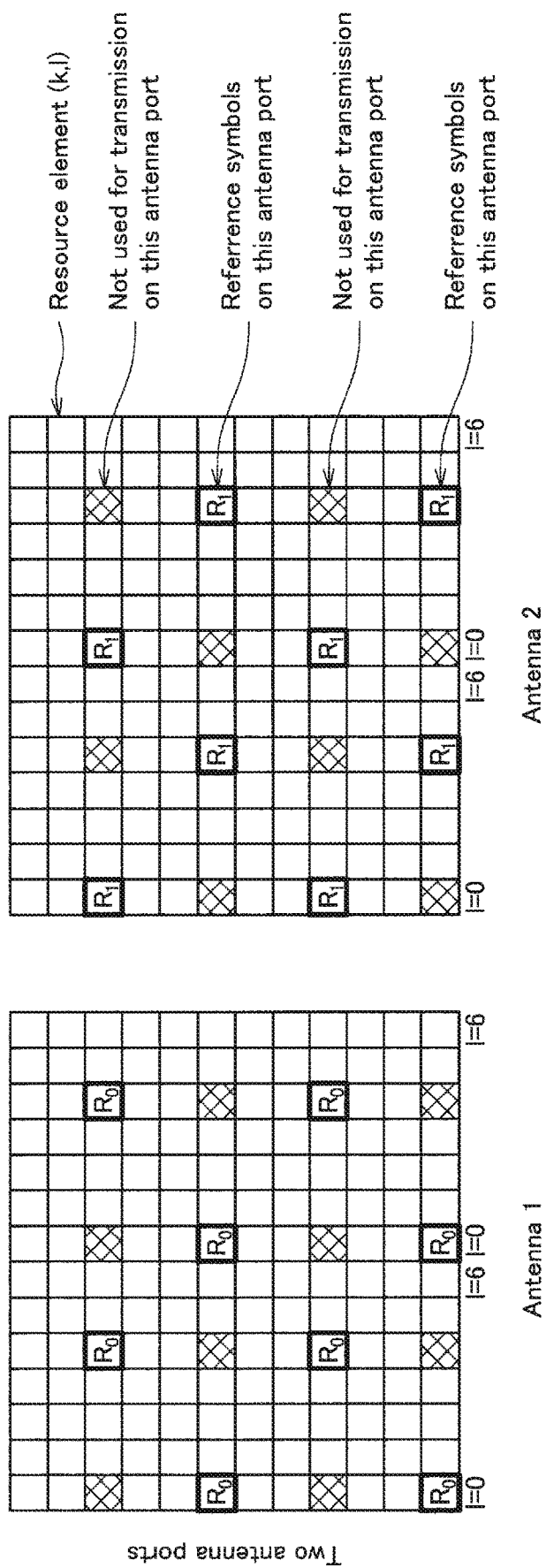
FIG. 24 is an explanatory diagram for explaining an example of a reference signal.

In addition, the CS-RS is a reference signal generated with a sequence determined by a cell ID of a serving cell, and for example, is used in a channel estimation under a fading environment, a multiple-input and multiple-output (MIMO), or the like. For example, FIG. 24 is an explanatory diagram for explaining an example of the reference signal and shows an example of the CS-RS in a case of 2×2 MIMO. As shown in FIG. 24. CS-RSs referenced for each antenna are mapped to different wireless resources.

In addition, the CSI-RS is a reference signal used in measuring a channel quality indicator (CQI) that is an indicator indicating downlink reception quality. The CSI-RS is multiplexed with a long period of about once for each of a plurality of subframes as compared with the CS-RS.

Figure 25:
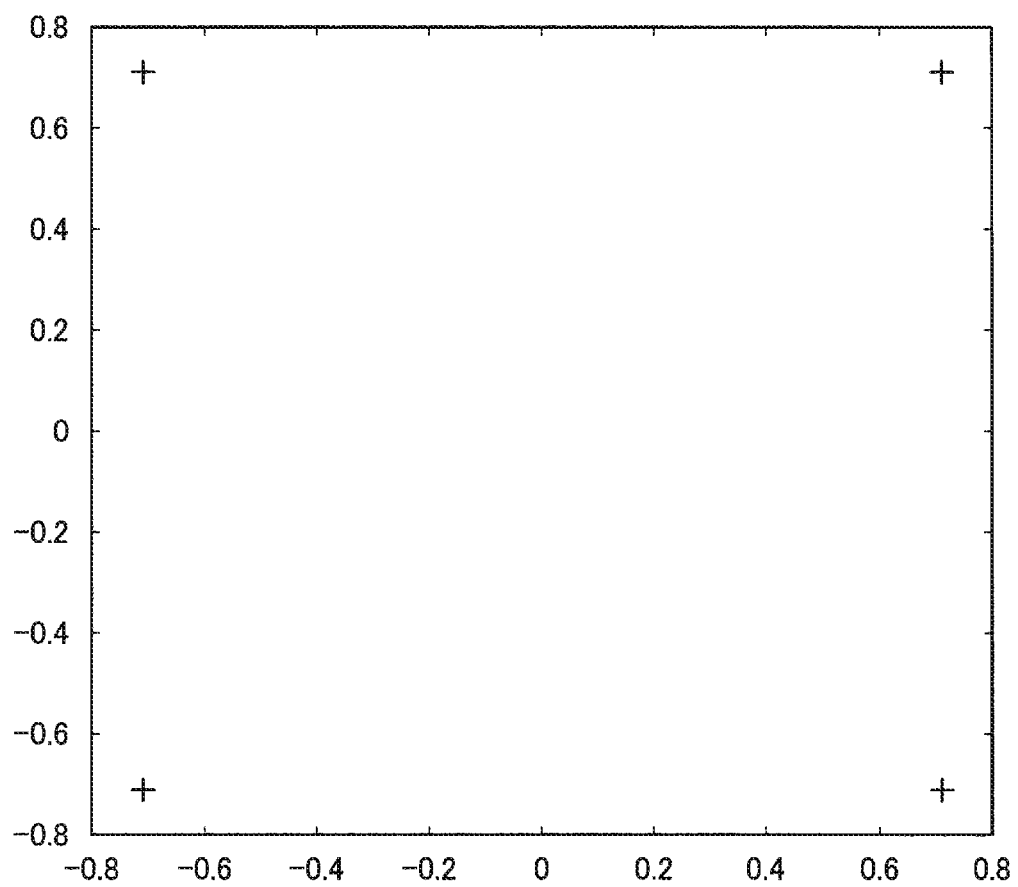
FIG. 25 is an explanatory diagram for explaining an example of a constellation of the reference signal.

Here, referring to FIG. 25, an example of a constellation of the reference signal will be described focusing on the CS-RS. FIG. 25 is an explanatory diagram for explaining the example of the constellation of the reference signal and shows the constellation of the CS-RS. As can be understood from FIG. 25, the constellation of the CS-RS is similar to that of a QPSK constellation.

In addition, in the FBMC method that is a 5G communication method, the modulation method is the FBMC/OQAM method differently from the QAM modulation in the LTE. In a case of the FBMC/OQAM method, so-called imaginary interference occurs with respect to a pilot symbol (a reference signal) mapped on a time-frequency axis similar to that of the CP-OFDM. An example of a method of canceling such imaginary interference includes a method of newly adding a spare pilot symbol (an auxiliary pilot symbol) to a pilot symbol mapped on the time-frequency axis in the CP-OFDM method or a method of adding a pre-coded pilot symbol.

Figure 26:
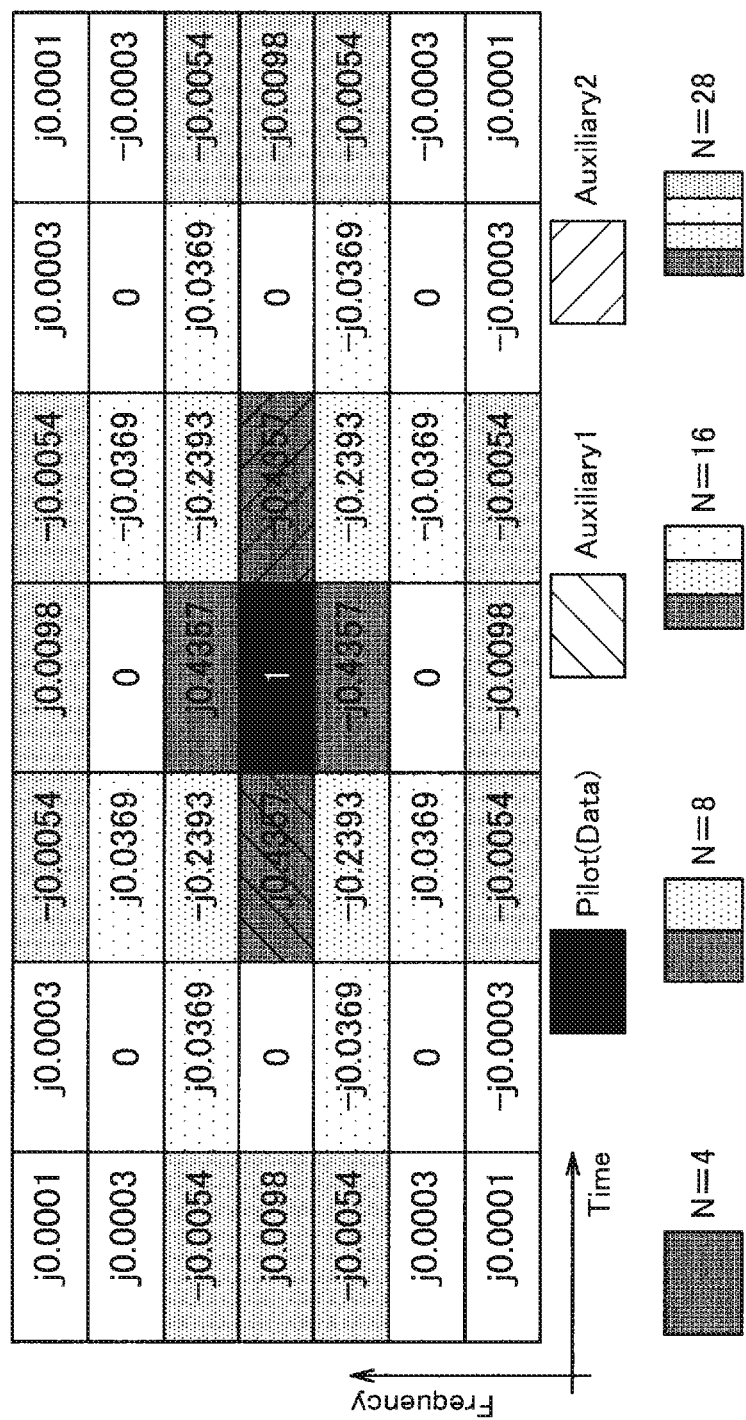
FIG. 26 is an explanatory diagram for explaining another example of the reference signal.

For example, FIG. 26 is an explanatory diagram for explaining another example of the reference signal, and shows an example in a case in which a spare pilot symbol is added around the pilot symbol. In FIG. 26, a horizontal axis denotes a time and a vertical axis denotes a frequency. Note that FIG. 26 shows an example in a case in which two spare pilot symbols are added around the pilot symbol. In addition, among numerical values indicated for each symbol, a negative value indicates a degree of interference (that is, the imaginary interference) in the symbol. As shown in FIG. 26, it is possible to supplement a measurement result of the degree of the interference based on the pilot symbol by adding the spare pilot symbol around the pilot symbol by measurement result of the degree of the interference based on the spare pilot symbol. Based on such a configuration, it is possible to cancel the imaginary interference by using the measurement result of the degree of the interference based on the spare pilot symbol.

Figure 27:
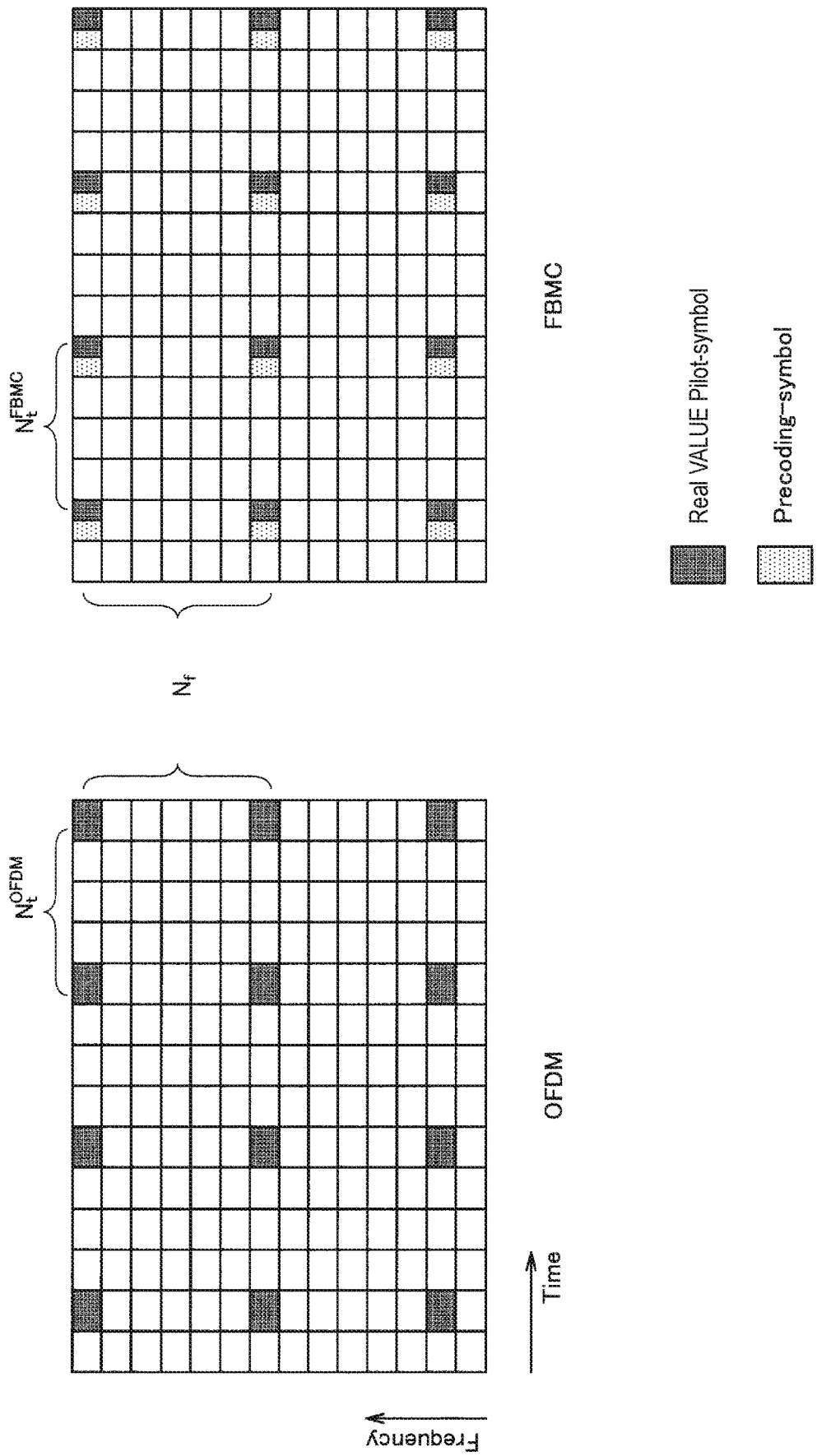
FIG. 27 is an explanatory diagram for explaining another example of the reference signal.

In addition, FIG. 27 is an explanatory diagram for explaining another example of the reference signal, and shows an example in a case in which the pre-coded pilot symbol is added. In FIG. 27, a horizontal axis denotes a time and a vertical axis denotes a frequency. In addition, in FIG. 27, the left diagram shows an example of a case of the existing OFDM and the right diagram shows an example of a case of the FBMC. In the example shown in the right diagram of FIG. 27, the pre-coded pilot symbol is added around the pilot symbol. The pre-coded pilot symbol is demodulated on the basis of corresponding coding information. Therefore, only a device recognizing the coding information is able to demodulate the pre-coded pilot symbol. With such a configuration, it is less susceptible to interference.

Note that the above-described reference signal is merely an example, and as long as the reference signal used in generating the correction data by the terminal device 200 is the reference signal on which the phase modulation or the quadrature amplitude modulation is implemented, content and type of the reference signal are particularly not limited. In addition, in generating the correction data, a reference signal transmitted for each subframe such as the CS-RS may be used, or a reference signal transmitted for a plurality of subframes such as the CSI-RS may also be used.

5.2. Generation of Correction Data

Next, the details of the process related to the generation of the correction data by the terminal device 200 (the generation unit 245) according to the present embodiment will be described. Note that, in the present description, in order to make it easier to understand the process related to the generation of the correction data, attention is paid to a case in which the correction data is generated on the basis of the reception result of the reference signal in the downlink signal of the LTE.

Figure 28:
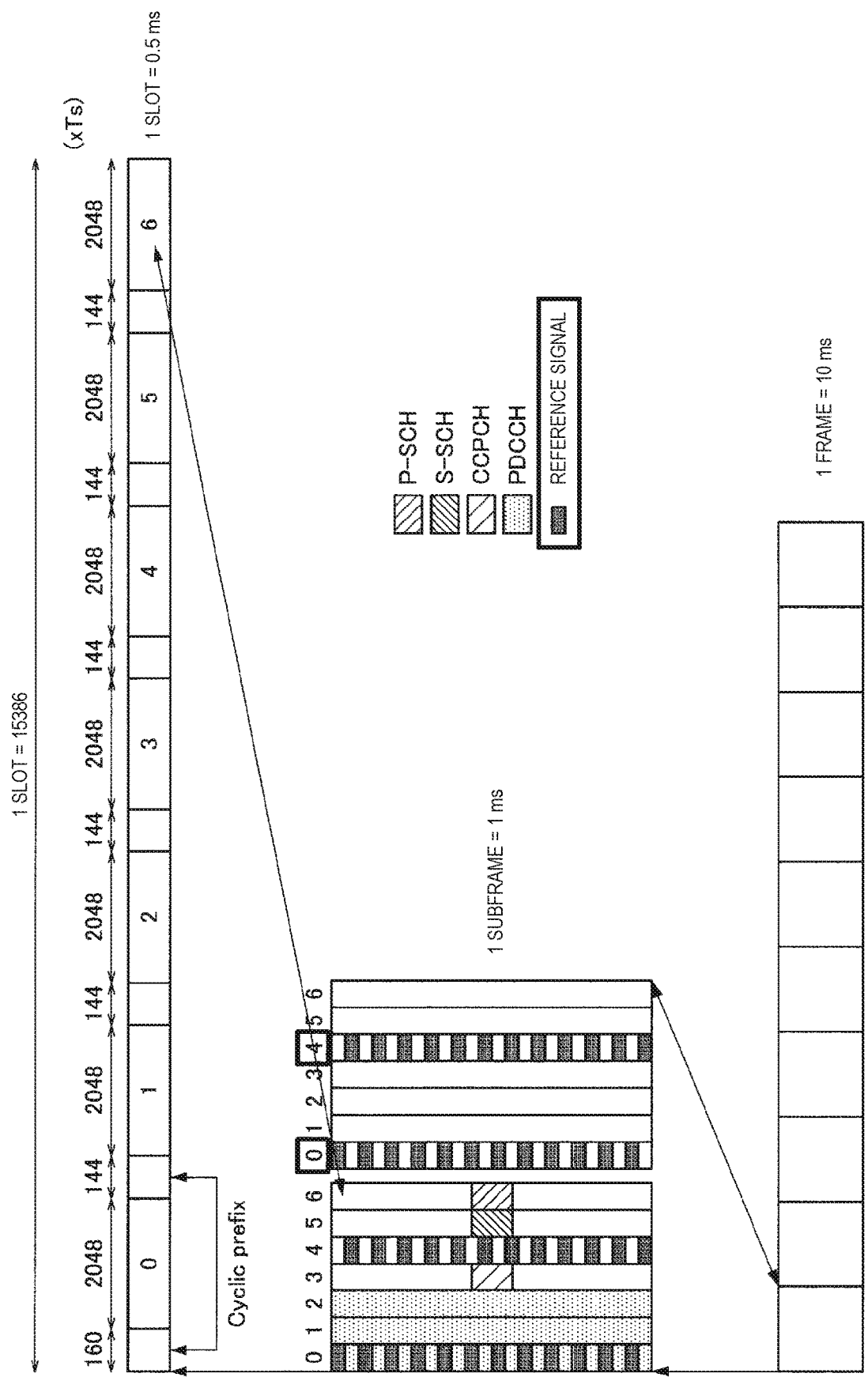
FIG. 28 is an explanatory diagram for explaining an example of a frame structure of a downlink signal in LTE.

For example, FIG. 28 is an explanatory diagram for explaining an example of a frame structure of the downlink signal in the LTE. As can be understood from FIG. 28, in the downlink signal of the LTE, two symbols per slot are set as the reference signal (reference signal).

Figure 29:
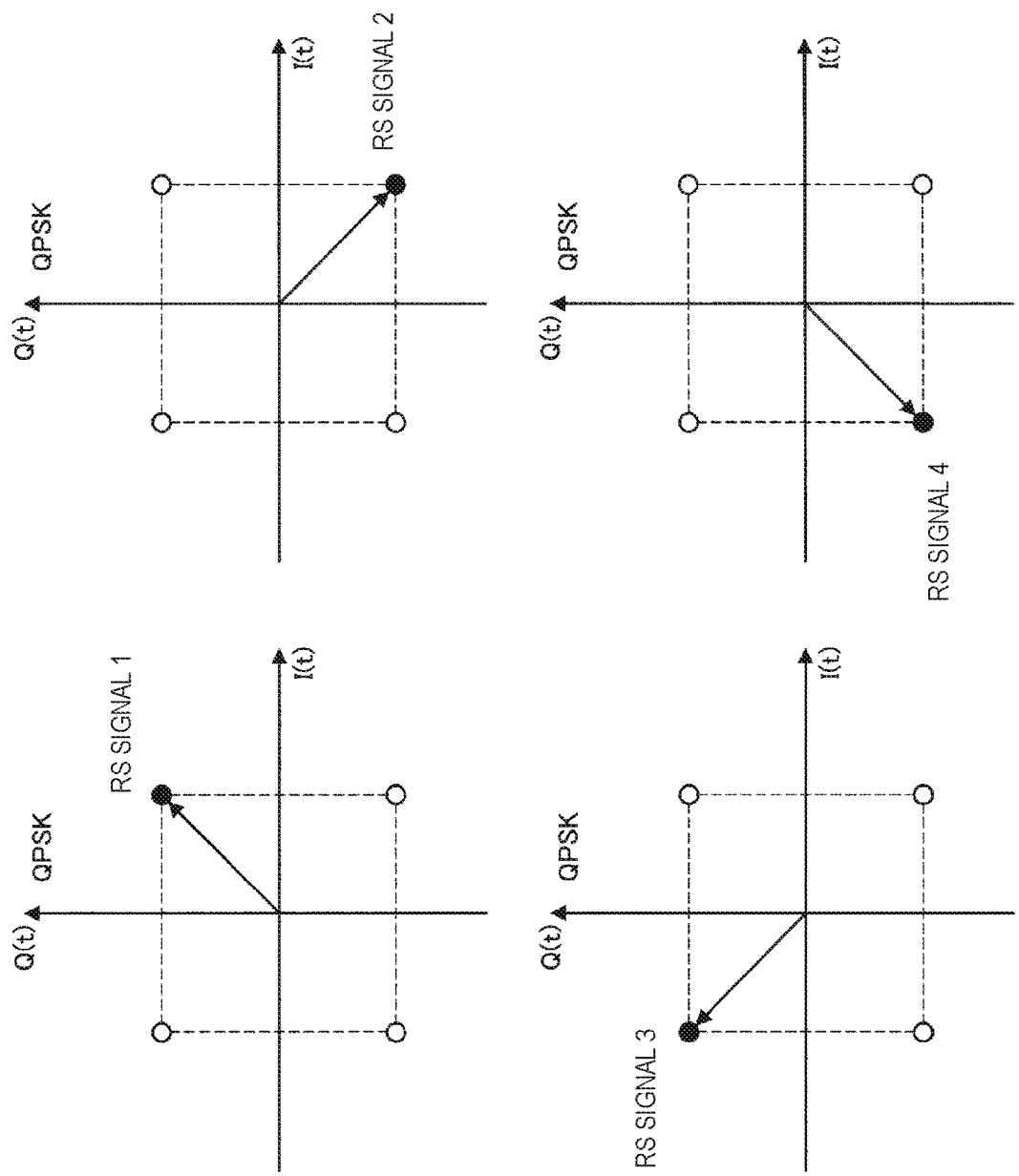
FIG. 29 is an explanatory diagram for explaining an example of the reference signal in the downlink signal of LTE.

In addition, FIG. 29 is an explanatory diagram for explaining an example of the reference signal (reference signal) in the downlink signal of the LTE. For example, as shown in FIG. 29, QPSK mapping is implemented on the CS-RS in the downlink signal of the LTE, and the mapping information is known between the base station 100 and the terminal device 200. On the basis of such a configuration, the CS-RS is used, for example, to correct distortion of the amplitude or the phase due to fading by channel estimation based on the mapping information.

The terminal device 200 according to the present embodiment estimates and corrects (calibrates) a phase error or an amplitude error occurring in the IQ signal by using the channel estimation based on the reference signal (reference signal) as described above. For example, FIGS. 30 and 31 are explanatory diagrams for explaining a principle of a process for estimating and correcting the phase error and the amplitude error occurring in the IQ signal.

Figure 30:
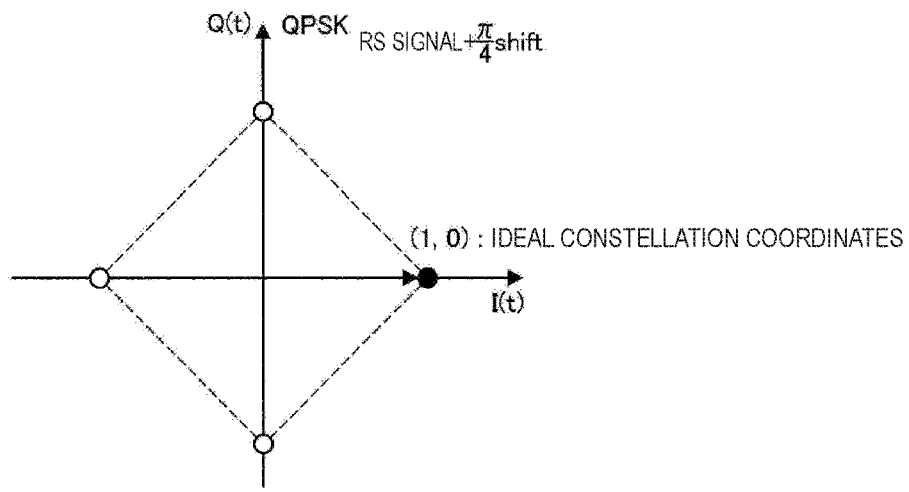
FIG. 30 is an explanatory diagram for explaining a principle of a process for estimating and correcting a phase error and an amplitude error occurring in an IQ signal.

For example, FIG. 30 schematically shows an example of the signal point of the reference signal in a case in which a phase of the reference signal is rotated by +45° in a conducted environment in which the distortion of the amplitude or the phase due to the fading is not present. As shown in FIG. 30, ideal constellation coordinates of the reference signal is mapped on an IQ axis by rotating the phase by +45°.

Figure 31:
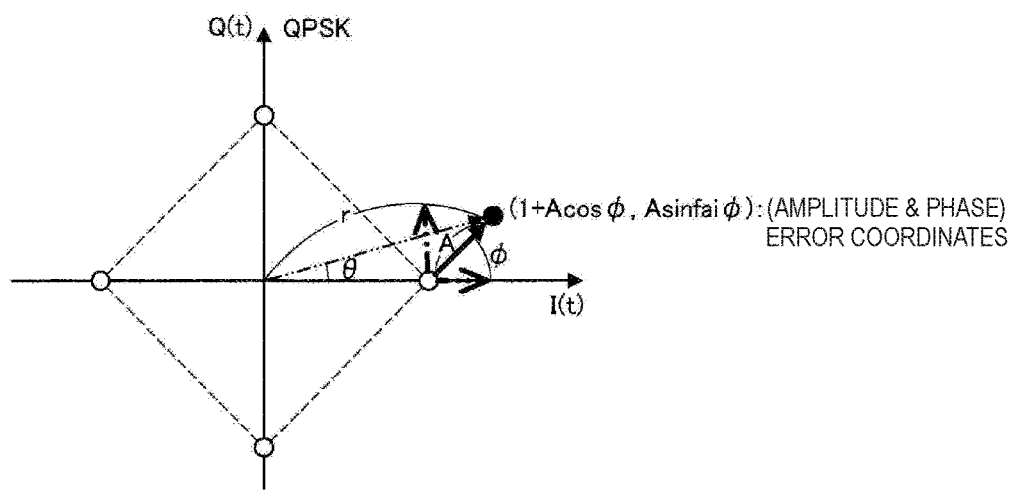
FIG. 31 is an explanatory diagram for explaining a principle of a process for estimating and correcting a phase error and an amplitude error occurring in an IQ signal.

On the other hand, FIG. 31 schematically shows an example of the signal point of the reference signal in a case in which the phase of the received reference signal is rotated by +45° in an environment in which the distortion of the amplitude or the phase due to the fading occurs. As shown in FIG. 31, in a case in which the ideal reference coordinates (that is, the ideal constellation coordinates) are (1, 0), an amplitude error component is A, and a phase error component is $\varphi$, the coordinates (hereinafter also referred to as "error coordinates") of the signal point of the reference signal in which the amplitude and phase error occurs are expressed as by $(1+A \cos \varphi, A \sin \varphi)$.

Here, attention is paid to a case in which the DCR chip receives the reference signal in the conducted environment. For example, the coordinates of a case in which the phase of the ideal constellation coordinates of the reference signal received by the DCR chip is rotated by +45° are the same as the ideal constellation coordinates shown in FIG. 30. On the other hand, under a situation in which the IQ imbalance occurs due to the variation in CMOS, the coordinates of the signal point of the reference signal of a case in which the phase of the reference signal received by the DCR chip is rotated by +45° are the same as the error coordinates shown in FIG. 31.

Here, in a case in which it is assumed that the error coordinates are $(1+A \cos \varphi, A \sin \varphi)$, it is possible to obtain the value of the error coordinates, for example, by an FFT demodulation calculation process and an additional numerical calculation process in a reception unit. In addition, in a case in which it is assumed that complex IQ coordinates obtained by the calculation process are $(I(t), Q(t))$, it is possible to convert the complex IQ coordinates into a polar coordinate form expressed by an amplitude component r and a phase component $\theta$ by the CORDIC circuit.

That is, it is possible to calculate r and $\theta$ indicating the degree of the error of the IQ imbalance that is a fixed deterioration component occurring in the DCR chip by using the above-described property.

Note that, as shown in FIG. 31, values indicated by r and $\theta$ indicating the degree of the error of the IQ imbalance do not directly indicate values of the amplitude error component A and the phase error component $\varphi$, respectively. However, it is possible to calculate r and $\theta$ indicating the degree of the error of the IQ imbalance by converting IQ absolute coordinates of the ideal constellation coordinates and the error coordinates to the polar coordinate form by the CORDIC circuit and comparing the IQ absolute coordinates of the ideal constellation coordinates and the error coordinates with each other.

Figure 32:
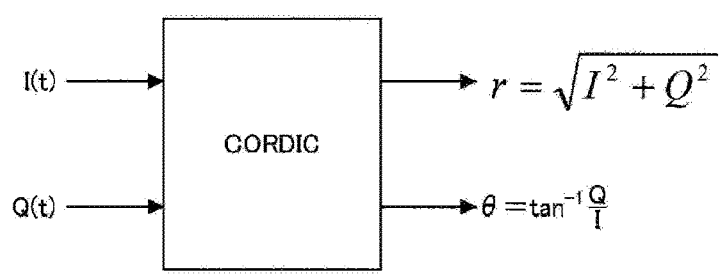
FIG. 32 is a block diagram illustrating an outline configuration of a CORDIC circuit.

For example, FIG. 32 is a block diagram illustrating an outline configuration of the CORDIC circuit and shows a basic principle of a process of converting the complex IQ coordinates $(I(t), Q(t))$ into the amplitude component r and the phase component $\theta$.

Here, as shown in FIG. 30, in a case in which it is assumed that the ideal constellation coordinates are (1, 0), in an ideal state in which the IQ imbalance does not occur, A=0 and $\varphi$=0 are satisfied. That is, in r and $\theta$ obtained by converting the IQ absolute coordinates into the polar coordinate form, a case in which a relation formula $\cos \theta = 1$, $\sin = 0$, r=1 are established is the ideal state.

Normally, in a case in which the FFT demodulation calculation process is performed, the RF signal received at the antenna end is down-converted to baseband I and Q signals by a complex mixing circuit, and then, quantized into digital signal data by an ADC through an anti-aliasing filter. That is, the terminal device 200 according to the present embodiment generates the correction data for correcting (in other words, for calibrating) the digital signal data demodulated from the reference signal received by the DCR chip so that a condition of $\cos \theta = 1$, $\sin = 0$, r=1 is satisfied.

It is possible to correct the IQ imbalance occurring in the signal received by the DCR chip, for example, in actual communication on the basis of the correction data by generating the correction data as described above.

Note that, as described above, the terminal device 200 according to the present embodiment generates the correction data on the basis of a calculation result of the deviation between the ideal constellation coordinates on the IQ plane and the coordinates of the signal point indicated by the reception result of the reference signal. Therefore, as long as a reference signal on which the phase modulation or the quadrature phase amplitude modulation is implemented, the reference signal is not limited to the CS-RS and is able to be used in the generation of the correction data. As a more specific example, the spare pilot symbol described with reference to FIG. 26 and the pre-coded pilot symbol described with reference to FIG. 27 may be used in the generation of the correction data. In addition, even in a new communication standard, in a case in which there is a known reference signal on which the phase modulation or the quadrature amplitude modulation is implemented, it is possible to generate the correction data according to the present embodiment by measuring the deviation of the phase or the amplitude on the basis of the reference signal.

The details of the process related to the generation of the correction data by the terminal device 200 (the generation unit 245) according to the present embodiment has been described above with reference to FIGS. 28 to 32. Note that a part of the generation unit 245 that calculates the deviation between the ideal constellation coordinates on the IQ plane and the coordinates of the signal point indicated by the reception result of the reference signal corresponds to an example of a "calculation unit". In addition, the portion of the generation unit 245 that generates the correction data on the basis of a calculation result of the deviation corresponds to an example of the "generation unit".

6. Embodiment

Next, an embodiment of the terminal device 200 according to an embodiment of the present disclosure will be described.

6.1. Embodiment 1: Example of Design of DCR Chip

First, as an embodiment 1, an example of the design of the DCR chip applied to the terminal device 200 will be described.

In the DCR chip design, in order to compensate for a dynamic range between a minimum reception sensitivity and a maximum input level and an attenuation of a received signal due to a fading fluctuation in a real environment, a to necessary dynamic range is realized by, for example, two blocks of an AGC amplifier and an ADC.

On the other hand, in a case in which the number of bits of the ADC is increased in order to secure the dynamic range, the number of gates tends to increase in a processing unit of the baseband signal. Therefore, for example, a method of securing the dynamic range by a block of the AGC amplifier is also used in some cases.

However, in recent years, along with miniaturization of CMOS and realization of a high-speed and high-resolution pipeline type ADC, a DCR chip configured to receive a received signal directly from a complex down converter to an ADC without using an AGC amplifier has also been put to practical use.

Figure 33:
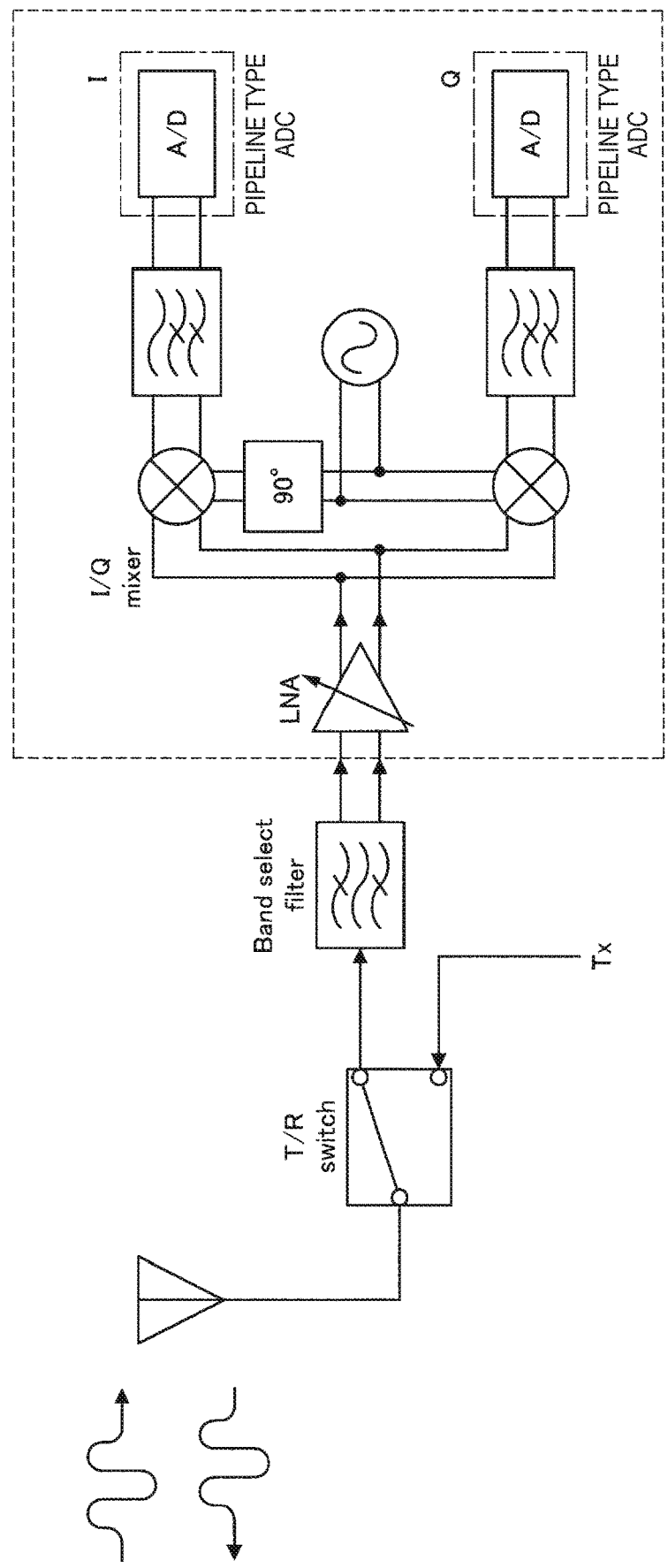
FIG. 33 is an explanatory diagram for explaining an outline of a DCR chip according to an embodiment 1.

For example, FIG. 33 is an explanatory diagram for explaining an outline of the DCR chip according to the embodiment 1 and shows an example of a functional configuration of the DCR chip focusing on the reception unit.

As shown in FIG. 33, transmission and reception of a wireless signal through an antenna element is selectively switched by, for example, a T/R switch. The RF signal received by the antenna element is input to the complex mixing circuit (an IQ mixer) through a band select filter and down-converted to the baseband I and Q signals by the complex mixing circuit. Note that, in FIG. 33, a portion indicated by a chain line is able to be configured as, for example, the pipeline type ADC.

Here, attention is paid to a case in which the necessary dynamic range is realized in the ADC. In such a case, with respect to a signal (about 10 dB) having a large peak factor of an original signal waveform, such as an OFDM signal, or a signal of 20 to 30 dB corresponding to an instantaneous fading variation of a case in which an adaptive equalizer is used, it is desirable to deal with using the dynamic range of the ADC. Therefore, for example, it is desirable to secure a dynamic range of about 50 to 60 dB or more in total.

For example, the SNR of the ADC is expressed by the following formula (Formula 3). Note that, in the following (Formula 3), N indicates a bit depth. In addition, OSR indicates an oversampling ratio.

[Math. 3]

$$SNR = 6.02N + 1.76 + 10 \log OSR \quad \text{(Formula 3)}$$

That is, in a case in which the above-described dynamic range is realized, it is presumed that at least 12 bits are necessary in consideration of an effective number of bits (ENOB) in the ADC.

Here, it is assumed that the number of bits of the ADC used in the reception unit of the DCR chip is 13 bits. In general, since $\sin \theta$ and $\cos \theta$ are able to obtain positive and negative values, complement of two is used as the ADC. Therefore, a range of $\sin \theta$ and $\cos \theta$ is expressed by $\pm 4096 = 2^{12}$.

Here, in a case in which it is assumed that a target level of the ADC is set to ½ of a full scale, $\cos \theta$, $\sin \theta$, and r are expressed as follows in a case in which $\cos \theta = 1$, $\sin \theta = 0$, $r = 1$ are satisfied.

$$\cos \theta = 2048 = 2^{11} \text{->} 1,$$

$$\sin \theta = 0 \text{->} 0.$$

$$r = 2047 = 2^{11} \text{->} 1$$

Figure 34:
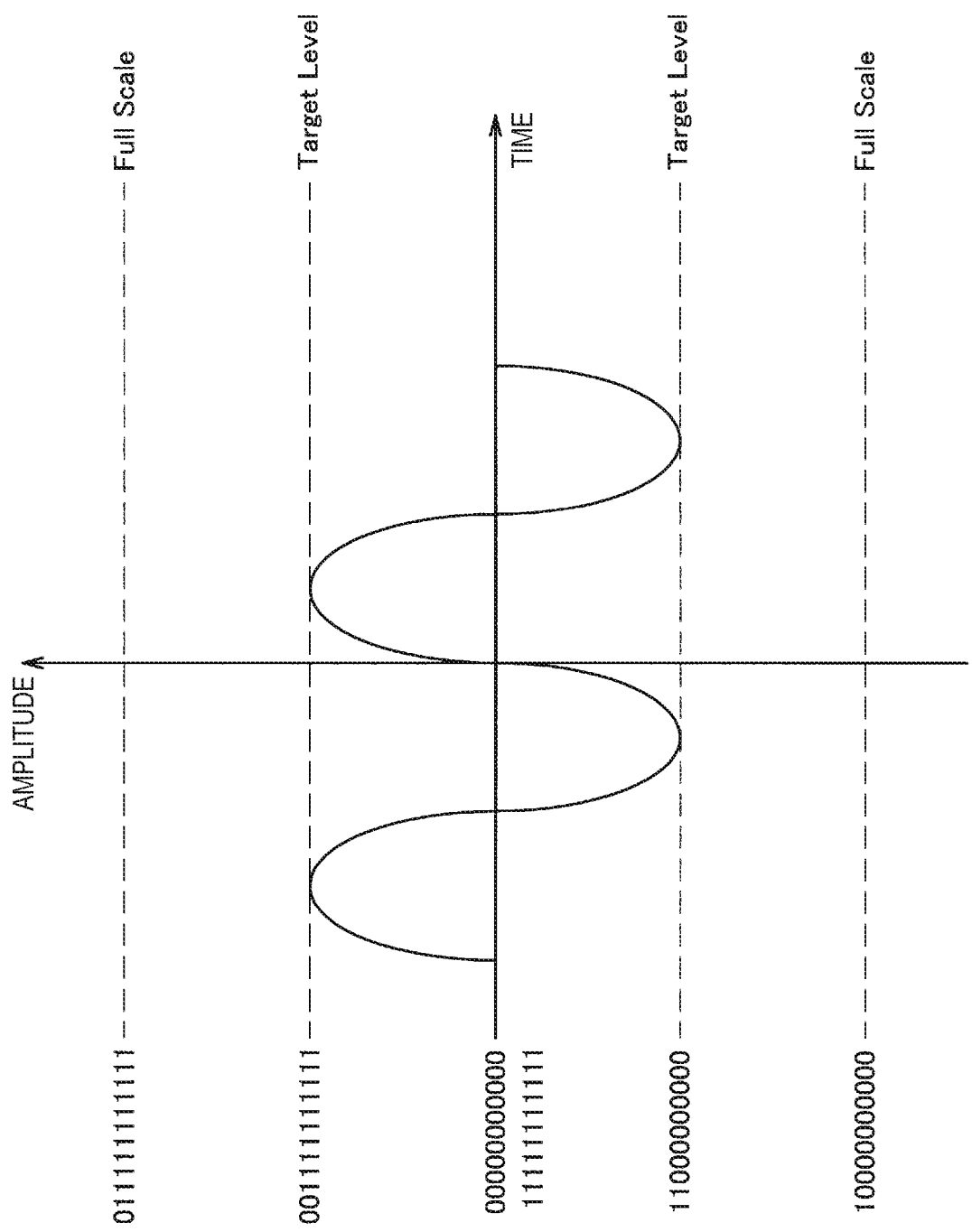
FIG. 34 is an explanatory diagram for explaining an example of a design of the DCR chip according to the embodiment 1.

For example, FIG. 34 is an explanatory diagram for explaining an example of the design of the DCR chip according to the embodiment 1, and shows an example of a correspondence relationship between transmitted and received signals and the digital data based on the above-described setting.

As described above, as an example 1, an example of the design of the DCR chip applied to the terminal device 200 has been described.

6.2 Embodiment 2: Correction of IQ Imbalance

Next, as an embodiment 2, an example of a correction method for correcting the IQ imbalance of each terminal device 200 will be described.

As described above, in the FBMC method or the f-OFDM method that are considered to be applied at 5G, due to a feature unique to a modulation method thereof or multi-valuing modulation applied for realizing a high data rate, deterioration of a reception feature due to the IQ imbalance appears more noticeably than the CP-OFDM method.

Meanwhile, in DCR, chip used for the modulation and the demodulation of the transmitted and received signal, along the miniaturization of the CMOS process, the variation between the devices such as the CMOSFETs tends to more noticeably appeared. Therefore, in a case in which the DCR chips are mass-produced, for example, it is assumed that chips with poor an IQ imbalance feature are statistically generated more frequently in complex mixers or the like used in the down converter.

In consideration of such a situation, in the terminal device 200 according to the present embodiment, on the premise that the IQ imbalance according to the variation between the devices such as the CMOSFET may occur, the correction data for correcting the IQ imbalance is generated. Specifically, as described above, the terminal device 200 receives the reference signal (reference signal) used m the actual communication through the conducted environment in which the distortion of the amplitude or the phase due to the fading is not present, and generates the correction data on the basis of the reception result. For example, FIG. 35 is an explanatory diagram for explaining the correction method of the IQ imbalance according to the embodiment 2.

Figure 35:
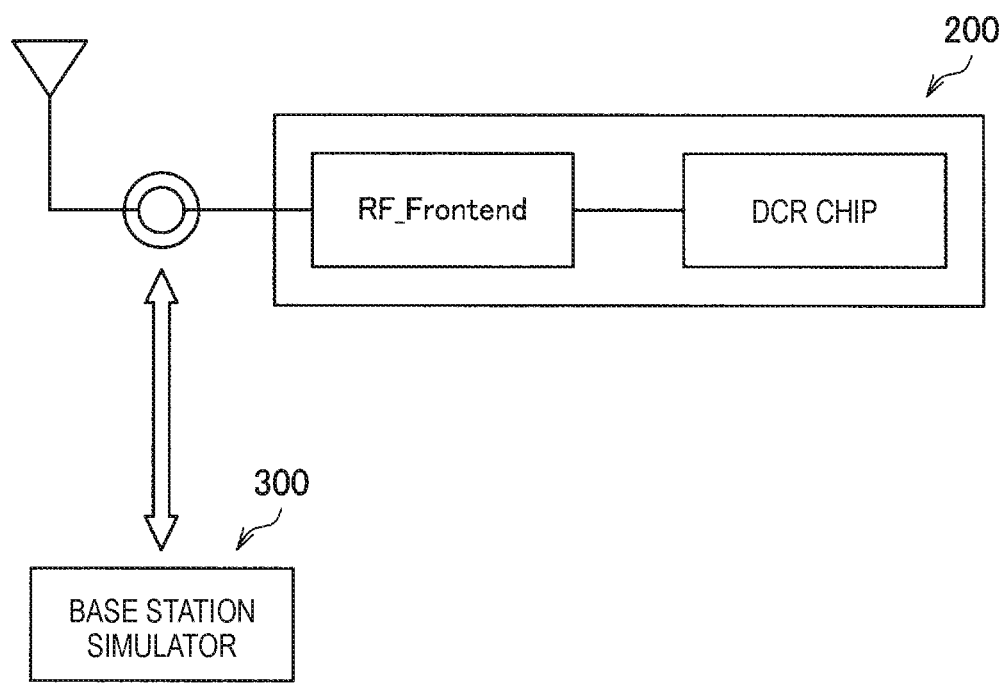
FIG. 35 is an explanatory diagram for explaining a correction method of an IQ imbalance according to an embodiment 2.

In the example shown in FIG. 35, a base station simulator 300 that simulates the above-described base station 100 is connected to the terminal device 200 through a cable. On the basis of such a configuration, a downlink signal including a predetermined reference signal (reference signal) is transmitted to the terminal device 200 from the base station simulator 300 through the cable. At this time, the cable connecting the terminal device 200 and the base station simulator 300 corresponds to the conducted environment in which the distortion of the amplitude or the phase due to the fading is not present.

A downlink signal transmitted from the base station simulator 300 to the terminal device 200 through the cable is received by an RF front end (communication unit) and demodulated by the DCR chip. At this time, the DCR chip measures the deviation (that is, the phase error and the amplitude error) of the signal point of the reference signal on the basis of the reception result of the reference signal included in the downlink signal and generates the correction data for correcting the IQ imbalance on the basis of a measurement result.

As a more specific example, attention is paid to a case in which the DCR chip is generated on the basis of the design described as the embodiment 1 and the correction data is generated on the basis of the reception result of the CS-RS. In this case, the correction data is generated so that a demodulation result of the CS-RS satisfies the following condition on the digital data on the basis of the result of the numerical calculation process in the IQ down-conversion from the RF signal to the BB signal.

$$\cos\theta = 2048 = 2^{11} \to 1,$$

$$\sin\theta = 0 \to 0,$$

$$r = 2047 = 2^{11} \to 1$$

Note that the generated correction data is held in a storage region that is able to be read by the DCR chip, and is used, for example, for correcting (calibrating) the IQ imbalance occurring in a signal received in the actual communication.

For example, on the basis of the above-described sequence, each terminal device 200 (or a communication module applied to the terminal device 200) is sequentially connected to the base station simulator 300), a predetermined downlink signal is transmitted to the terminal device 200 from the base station simulator 300, and thus the IQ imbalance of the terminal device 200 is corrected. Note that, in order to correct the IQ imbalance, in a case in which the downlink signal is transmitted to the terminal device 200 from the base station simulator 300, a downlink signal including a predetermined reference signal may be intentionally transmitted. From such a configuration, the reference signal used for correcting the IQ imbalance is not particularly limited in terms of content, type, timing to be multiplexed, and the like. In addition, such correction of each terminal device 200 may be performed, for example, in a mass production line process.

As described above, as the example 2, an example of the correction method for correcting the IQ imbalance of each of the terminal devices 200 has been described with reference to FIG. 35.

7. Application Examples

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or permanently. Moreover, at least some of the constituent elements of the base station 100 may be realized in a base station device or a module for the base station device.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC terminal). Moreover, at least some of the constituent elements of the terminal device 200 may be realized in a module mounted on the terminal (for example, an integrated circuit module configured on one die).

8. Hardware Configuration

Figure 36:
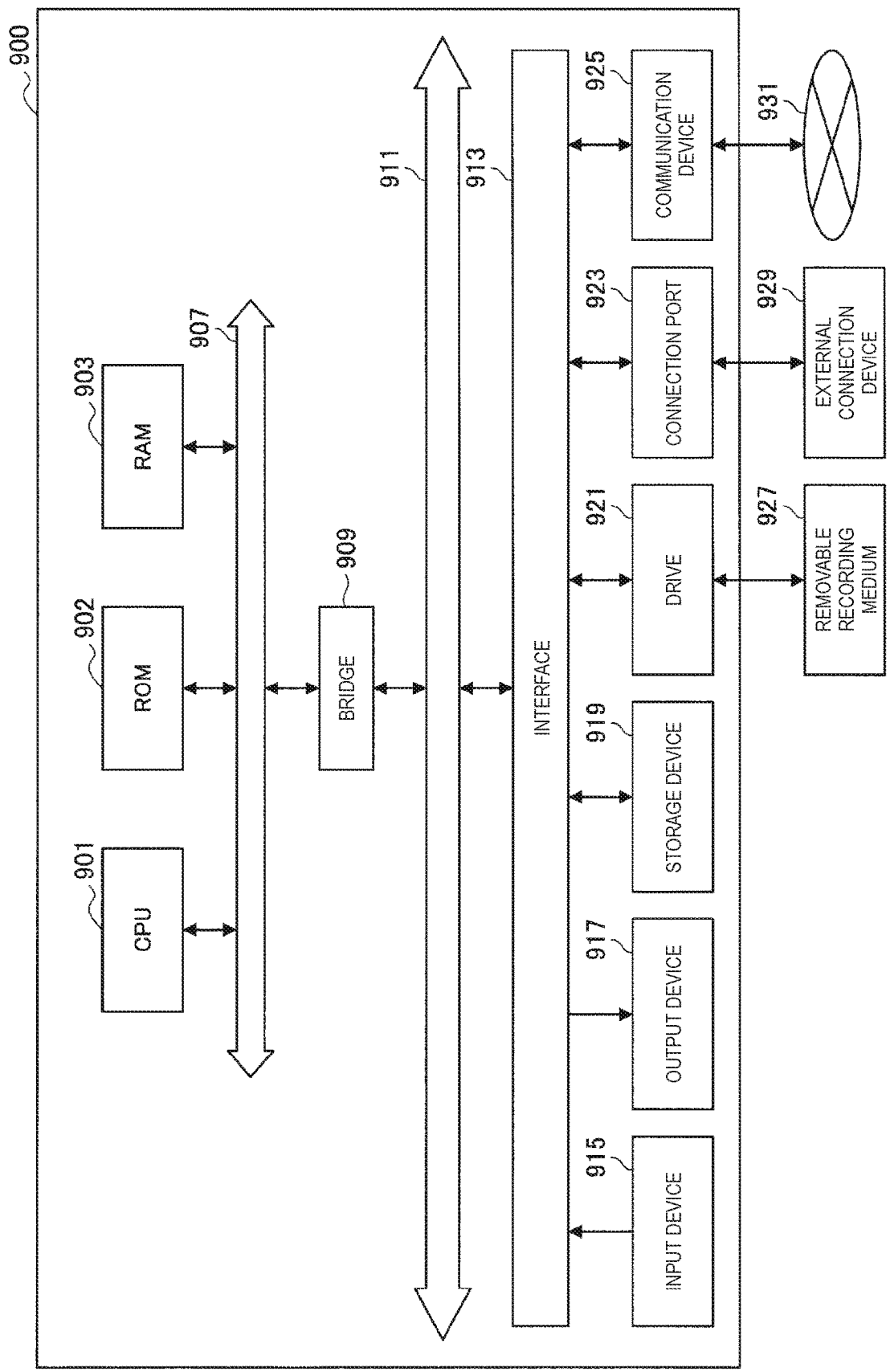
FIG. 36 is a block diagram illustrating an example of a hardware configuration of an information processing device included in the system according to the embodiment.

Next, like the base station 100 and the terminal device 200 described above, a hardware configuration of an information processing device 900 included in the system 1 according to the present embodiment will be described in detail with reference to FIG. 36. FIG. 36 is a block diagram illustrating an example of the hardware configuration of the information processing device 900 included in the information processing system 1 according to an embodiment of the present disclosure.

The information processing device 900 included in the information processing system 1 according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the processing unit 150 described above with reference to FIG. 22 and the processing unit 240 described above with reference to FIG. 23 can be realized by, for example, the CPU 901.

The host bus 907 is connected to the external bus 911 such as a PCI (Peripheral Component Interconnect/Interface), bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 Generates an input signal based on, for example. Information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) pout, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like. Note that the wireless communication unit 120) and the network communication unit 130 described above with reference to FIG. 22 or the wireless communication unit 220 described with reference to FIG. 23 is able to be realized, for example, by the communication device 925.

Heretofore, an example of the hardware configuration capable of realizing the functions of the information processing device 900 included in the information processing system 1 according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 36, for example, it naturally includes various configurations corresponding to the information processing device 900 included in the information processing system 1 according to the present embodiment.

Note that it is also possible to develop a computer program for realizing the respective functions of the information processing device 900 included in the information processing system 1 according to the present embodiment as discussed above and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (for example, a plurality of servers or the like). Note that a single computer or a plurality of cooperating computers is also referred to as "computer system."

9. Conclusion

As described above, the communication device (for example, the terminal device 200) according to the present embodiment calculates the error between the predetermined reference coordinates on the IQ plane and the signal point of the received reference signal, on the basis of the reception result of the predetermined reference signal (reference signal) on which the phase modulation or the quadrature amplitude modulation is implemented and the mapping information of the reference signal. In addition, the communication device generates the correction data for correcting the deviation of the signal point of the received signal on the basis of the calculation result of the error and uses the correction data in correcting (calibrating) the deviation of the signal point of the received signal in the actual communication.

That is, in the communication device according to the present embodiment, the IQ imbalance that occurs according to the feature of the circuit (in other words, the device) is measured on the basis of the reception result of the reference signal by the circuit used in the actual communication, and the correction data is generated on the basis of the measurement result. In other words, the communication device according to the present embodiment uses a function used in the actual communication, such as the channel estimation function when generating the correction data. Therefore, even in a situation in which the variation occurs in the devices such as the CMOSFETs, it is possible to more accurately correct (calibrate) the IQ imbalance that occurs according to the feature of the circuit (the device) with respect to the signal transmitted and received in the actual communication.

In addition, according to the communication device according to the present embodiment, the deviation (that is, the IQ imbalance) of the signal point of the transmitted and received signal may be corrected on the basis of the correction data generated as described above, and it is unnecessary to provide a dedicated circuit for performing complex signal processing for the configuration. Therefore, the communication device according to the present embodiment is able to more simplify the circuit related to communication and further to reduce the communication device value itself.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
a calculation unit configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and
a generation unit configured to generate correction data for correcting a deviation of a signal point of a received signal on a basis of a calculation result of the error.

(2)

The information processing device according to (1), in which the calculation unit calculates at least any of a phase error or an amplitude error of the signal point with respect to the reference coordinates, as the error.

(3)

The information processing device according to (2), in which the calculation unit calculates at least any of the phase error or the amplitude error on a basis of a CORDIC algorithm.

(4)

The information processing device according to any one of (1) to (3), in which the reference signal is a signal unique to a cell.

(5)

The information processing device according to any one of (1) to (3), in which the reference signal is a signal used in measuring reception quality in downlink.

(6)

The information processing device according to any one of (1) to (5), in which the received signal is a signal generated by separating a signal on which phase shift keying is implemented into signals for respective sub channels by a filter bank and equalizing the separated signals.

(7)

The information processing device according to any one of (1) to (6), in which the received signal is a signal on which an offset process is implemented in a time axis direction with respect to one of an in-phase component and an out-of-phase component.

(8)

The information processing device according to any one of (1) to (5), in which the received signal is a signal on which modulation is implemented on a basis of different conditions for respective sub bands.

(9)

The information processing device according to any one of (1) to (8), in which the calculation unit calculates the error on a basis of a reception result of the reference signal transmitted through a communication environment in which occurrence of amplitude and phase distortion due to fading is prevented.

(10)

The information processing device according to (9), in which the calculation unit calculates the error on a basis of the reception result of the reference signal transmitted from an external device simulating a base station through a cable.

(11)
A communication device including:
a calculation unit configured to calculate an error between predetermined reference coordinates on an IQ plane and a signal point of a received predetermined to reference signal on a basis of a reception result of the reference signal on which phase modulation or quadrature amplitude modulation is implemented and mapping information of the reference signal;
a generation unit configured to generate correction data for correcting a deviation of a signal point of a received signal on a basis of a calculation result of the error;
a communication unit configured to perform wireless communication; and
a correcting unit configured to correct the deviation of the signal point of the received signal received through the wireless communication on a basis of the generated correction data.

(12)
An information processing method including:
calculating, by a processor, an error between predetermined reference coordinates on an IQ plane and a signal point of a received predetermined reference signal on a basis of a reception result of the reference signal on which phase modulation or quadrature amplitude modulation is implemented and mapping information of the reference signal; and
generating, by the processor, correction data for correcting a deviation of a signal point of a received signal on a basis of a calculation result of the error.

(13)
A communication method including:
calculating, by a processor, an error between predetermined reference coordinates on an IQ plane and a signal point of a received predetermined reference signal on a basis of a reception result of the reference signal on which phase modulation or quadrature amplitude modulation is implemented and mapping information of the reference signal;
generating, by the processor, correction data for correcting a deviation of a signal point of a received signal on a basis of a calculation result of the error;
performing, by a communication unit, wireless communication; and
correcting, by the processor, the deviation of the signal point of the received signal received through the wireless communication on a basis of the generated to correction data.

(14)
A program that causes a computer to execute:
calculating an error between predetermined reference coordinates on an IQ plane and a signal point of a received predetermined reference signal on a basis of a reception result of the reference signal on which phase modulation or quadrature amplitude modulation is implemented and mapping information of the reference signal; and
generating correction data for correcting a deviation of a signal point of a received signal on a basis of a calculation result of the error.

(15)
A program that causes a computer to execute:
calculating an error between predetermined reference coordinates on an IQ plane and a signal point of a received predetermined reference signal on a basis of a reception result of the reference signal on which phase modulation or quadrature amplitude modulation is implemented and mapping information of the reference signal;
generating correction data for correcting a deviation of a signal point of a received signal on a basis of a calculation result of the error;
performing wireless communication; and
correcting the deviation of the signal point of the received signal received through the wireless communication on a basis of the generated correction data.

REFERENCE SIGNS LIST 1 system
100 base station
110 antenna unit
120 wireless communication unit
130 network communication unit
140 storage unit
150 processing unit
151 communication processing unit
153 notification unit
200 terminal device
210 antenna unit
220 wireless communication unit
230 storage unit
240 processing unit
241 information acquisition unit
243 communication processing unit
245 generation unit
300 base station simulator

The invention claimed is:
1. An information processing device comprising:
circuitry configured to
calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and
generate correction data for correcting a deviation of a signal point of a received signal on a basis of a calculation result of the error, wherein
the circuitry is configured to calculate at least any of a phase error or an amplitude error of the signal point with respect to the reference coordinates, as the error.

2. The information processing device according to claim 1, wherein
the circuitry is configured to calculate at least any of the phase error or the amplitude error on a basis of a CORDIC algorithm.

3. The information processing device according to claim 1, wherein
the reference signal is a signal unique to a cell.

4. The information processing device according to claim 1, wherein
the reference signal is a signal used in measuring reception quality in downlink.

5. An information processing device comprising:
circuitry configured to
calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and generate correction data for correcting a deviation of a signal point of a received signal on a basis of a calculation result of the error, wherein the received signal is a signal generated by separating a signal on which phase shift keying is implemented into signals for respective sub channels by a filter bank and equalizing the separated signals.

6. An information processing device comprising:

circuitry configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and generate correction data for correcting a deviation of a signal point of a received signal on a basis of a calculation result of the error, wherein the received signal is a signal on which an offset process is implemented in a time axis direction with respect to one of an in-phase component and an out-of-phase component.

7. An information processing device comprising:

circuitry configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and generate correction data for correcting a deviation of a signal point of a received signal on a basis of a calculation result of the error, wherein the received signal is a signal on which modulation is implemented on a basis of different conditions for respective sub bands.

8. An information processing device comprising:

circuitry configured to calculate an error between predetermined reference coordinates on an IQ plane and a signal point of a received predetermined reference signal on a basis of a reception result of the reference signal on which phase modulation or quadrature amplitude modulation is implemented and mapping information of the reference signal; and generate correction data for correcting a deviation of a signal point of a received signal on a basis of a calculation result of the error, wherein the circuitry is configured to calculate the error on a basis of a reception result of the reference signal transmitted through a communication environment in which occurrence of amplitude and phase distortion due to fading is prevented.

9. The information processing device according to claim 8, wherein the circuitry is configured to calculate the error on a basis of the reception result of the reference signal transmitted from an external device simulating a base station through a cable.

10. An information processing method comprising:

calculating, by a processor, an error between predetermined reference coordinates on an IQ plane and a signal point of a received predetermined reference signal on a basis of a reception result of the reference signal on which phase modulation or quadrature amplitude modulation is implemented and mapping information of the reference signal; and generating, by the processor, correction data for correcting a deviation of a signal point of a received signal on a basis of a calculation result of the error, wherein the calculating includes calculating at least any of a phase error or an amplitude error of the signal point with respect to the reference coordinates, as the error.

* * * * *